United States Patent
Fulghum et al.

(10) Patent No.: US 8,432,952 B2
(45) Date of Patent: Apr. 30, 2013

(54) METHOD AND APPARATUS FOR DS-CDMA INTERFERENCE SUPPRESSION USING CODE-SPECIFIC COMBINING

(75) Inventors: Tracy Fulghum, Durham, NC (US); Gregory Edward Bottomley, Cary, NC (US); Yi-Pin Eric Wang, Cary, NC (US); Ali S. Khayrallah, Apex, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2868 days.

(21) Appl. No.: 10/720,492

(22) Filed: Nov. 24, 2003

(65) Prior Publication Data

US 2005/0111528 A1    May 26, 2005

(51) Int. Cl.
   *H04B 1/707*    (2011.01)
(52) U.S. Cl.
   USPC .......................................... 375/148
(58) Field of Classification Search .............. 375/148, 375/130, 147, 152, 140, 150, 316
   See application file for complete search history.

(56) References Cited

U.S. PATENT DOCUMENTS

| | | | |
|---|---|---|---|
| 5,506,861 A | 4/1996 | Bottomley | |
| 5,724,378 A | 3/1998 | Miki et al. | |
| 5,754,583 A * | 5/1998 | Eberhardt et al. | 375/147 |
| 5,757,791 A | 5/1998 | Kanterakis et al. | |
| 5,983,105 A | 11/1999 | Stahle | |
| 6,026,115 A | 2/2000 | Higashi et al. | |
| 6,222,833 B1 | 4/2001 | Seo | |
| 6,363,104 B1 | 3/2002 | Bottomley | |
| 7,236,515 B1 | 6/2007 | Pope | |
| 2001/0053177 A1 * | 12/2001 | Papasakellariou | 375/142 |
| 2002/0131479 A1 * | 9/2002 | Butler et al. | 375/147 |
| 2003/0067968 A1 | 4/2003 | Gatherer et al. | |
| 2004/0213332 A1 | 10/2004 | Doetsch et al. | |

FOREIGN PATENT DOCUMENTS

| | | |
|---|---|---|
| GB | 2384665 | 7/2003 |
| GB | 2384665 A | 7/2003 |
| JP | 2003503878 A | 1/2003 |
| WO | WO 00/72459 | 11/2000 |
| WO | 0101594 A1 | 1/2001 |

OTHER PUBLICATIONS

Pub. No. US 2002/0122470 A1, Pub. Date: Sep. 5, 2002, "Method and Apparatus for Providing Blink Adaptive Estimation and Reception," Heikkila.

D.M. Novaković and M. L. Dukić, "Multistage multiuser detector for DS-CDMA multipath fading channel," *Electronics Letters*, vol. 34, No. 11, May 28, 1998, pp. 1068-1070.

Z. Xie, R.T. Short, and C.K. Rushforth, "A family of suboptimum detectors for coherent multiuser communications," *IEEE J. Sel. Areas Commun.*, vol. 8, pp. 683-690, May 1990.

(Continued)

*Primary Examiner* — Kevin M Burd
(74) *Attorney, Agent, or Firm* — Coats & Bennett, P.L.L.C.

(57) ABSTRACT

Interference, such as inter-symbol interference, from a symbol of interest in a RAKE receiver is reduced. The RAKE receiver comprises a plurality of RAKE fingers, a processor, and a combiner. The plurality of RAKE fingers despread symbols received over multiple paths of a multi-path channel. The processor determines cross-correlations between symbol waveforms from different symbols and multiple paths. The combiner combines the despread symbols using the cross-correlations to reduce interference from the symbol of interest.

71 Claims, 9 Drawing Sheets

OTHER PUBLICATIONS

S. Tantikovit, A.U.H. Sheikh and M.Z. Wang, "Combining schemes in rake receiver for low spreading factor long-code WCDMA systems," *Electronic Letters*, vol. 36, No. 22, Oct. 26, 2000, pp. 1872-1874.

S. Tantikovit and M.Z. Wang, "An optimum combining and concatenated-RAKE for dual-antenna mobile terminals in UMTS," *IEEE Commun. Letters*, vol. 6, pp. 231-233, Jun. 2002.

C.B. Papadias and H. Huang, "Linear space-time multiuser detection for multipath channels," *IEEE J. Sel. Areas Commun.*, vol. 19, pp. 254-265, Feb. 2001.

A. Klein, G.K. Kaleh, and P.W. Baier, "Zero forcing and minimum mean—square-error equalization for multiuser detection in code-division multiple-access channels." *IEEE Trans. Veh. Technol.*, vol. 45. pp. 276-287, May 1996.

X. Wang and H.V. Poor, "Space-time multiuser detection in multipath CDMA channels," *IEEE Trans. Sig. Proc.*, vol. 47, pp. 2356-2374, Sep. 1999.

M. Juntti, "Performance analysis of linear multisensor multiuser receivers for CDMA in fading channels," *IEEE J. Sel Area Commun.* vol. 18, pp. 1221-1229, Jul. 2000.

"Extended MMSE receiver for multisuer interference rejection in multipath DS-CDMA channels," in *Proc. IEEE Veh. Technol. Conf.*, Amsterdam, The Netherlands, Sep. 19-22, 1999, pp. 1840-1844.

W. L. Myrick, S. Sud, J.S. Goldstein, and M.D. Zoltowski, "MMSE correlator based RAKE receiver for DS-CDMA," in *Proc. Milcom 2001*, pp. 1418-1422.

S.S.H. Wijayasuriya, J.P. McGeehan, and G.H. Norton, "Rake decorrelating receiver for DS-CDMA mobile radio networks," *Electronics Letters*, vol. 29, No. 4, pp. 395-396, Feb. 18, 1993.

S.S.H. Wijayasuriya, J.P. McGeehan, and G.H. Norton, "Rake decorrelation as an alternative to rapid power control in DS-CDMA mobile radio," 43rd IEEE Vehicular Technology Conf., Secaucus, NJ, pp. 368-371, May 18-20, 1993.

G. Bottomley, T. Ottoson, and Y.-P. E. Wang, "A generalized RAKE receiver for interference suppression," *IEEE J. Sel. Areas Commun.*, vol. 18, pp. 1536-1545, Aug. 2000.

M. Juntti, and B. Aazhang, "Finite memory-length linear multiuser detection for asynchronous CDMA communications," *IEEE Trans. Commun.*, vol. 45, pp. 611-622, May 1992.

Deng et al., "A Multistage Multi-Carrier CDMA Receiver with Enhanced Interference Suppression," 3rd IEEE Signal Processing Workshop on Signal Processing Advances in Wireless Communications, Taiwan, Mar. 20-23, 2001.

Sukvasant et al., "A new RAKE receiver structure for the forward-link of W-CDMA systems," *IEICE Transactions on Communications*, vol. E85-B, No. 6, pp. 1218-1222, Jun. 2002, ISSN 0916-8516.

D.M. Novaković and M.L. Dukić, "Multistage multiuser detector for multipath fading channel," European Transactions on Telecommunications, vol. 12, No. 6, pp. 471-478, Nov.-Dec. 2001, ISSN 1120-3862.

Irfan Ghauri and Kirk T.M. Slock, "Linear Receivers for the DS-CDMA Downlink Exploiting Orthogonality of Spreading Sequences," Proc. 32nd Asilomar Conf. on Signals, Systems 8c Computers, Pacific Grove, CA, Nov. 1998.

H. Hadinejad-Mahram and G. Alirezaei, "A Linear Receiver for WCDMA Downlink Exploiting the Coloration of the Interference," 0-7803-7661-7/03/$17.00 © 2003 IEEE.

H. Huang and S. Schwartz, "A comparative Analysis of Linear Multiuser Detectors for Fading Multipath Channels," presented at Globecom '94 conference, 1994 IEEE, pp. 11-15.

S. Tantikovit and A. U. H. Sheikh, "Joint Multipath Diversity Combining and MLSE Equalization (Rake-MLSE Receiver) for WCDMA Systems," presented at VTC2000, 2000 IEEE, pp. 435-439.

J.G. Proakis, Digital Communications, 2nd edition, section 7.5.

E. Dahlman and M. Sawahashi, "13.3G Evolution and Future-Generation Air Interface in Mobile Communications".

Kutz, G. et al: "Low Complexity Implementation of a Downlink CDMA Generalized Rake Receiver" VTC 2002-Fall. 2002 IEEE 56th. Vehicular Technology Conference Proceedings. Vancouver, Canada, Sep. 24-28, 2002, IEEE Vehicular Technology Conference, New York, NY: IEEE, US, vol. 1 of 4, Conf. 56, Sep. 24, 2002, pp. 1357-1361, XP010608650 ISBN: 0-7803-7467-3.

Co-pending U.S. Appl. No. 11/566,820, filed Dec. 5, 2006.

Co-pending U.S. Appl. No. 11/935,840, filed Nov. 7, 2007.

Woong Kang, J. "Extended one-shot decorrelating detector for asynchronous DS/CDMA systems in multipath fading channels." 2000 IEEE 51st Vehicular Technology Conference Proceedings, 2000, VTC 2000—Spring, Tokyo, vol. 3, pp. 2034-2038.

Krenz, R. "Joint multipath combining and ICI rejection for multicode system." 14th IEEE Proceedings on Personal, Indoor and Mobile Radio Communications, 2003, PIMRC 2003, Sep. 7-10, 2003, vol. 3, pp. 2905-2909.

\* cited by examiner

METHOD AND APPARATUS FOR DS-CDMA INTERFERENCE SUPPRESSION USING CODE-SPECIFIC COMBINING

BACKGROUND OF THE INVENTION

The present invention relates generally to RAKE receivers and particularly to interference suppressing RAKE receivers.

RAKE receivers represent a well-known approach to multi-path reception, particularly in Direct Sequence Code Division Multiple Access (DS-CDMA) wireless communication. In a multi-path communication channel, a transmitted signal travels through multiple propagation paths to the receiver. Thus, the receiver receives multiple "echoes" of the transmitted signal, with each multi-path echo generally suffering from different path delay, phase, and attenuation effects.

RAKE receivers exploit multi-path propagation by assigning each of two or more RAKE "fingers" to one of the incoming multi-path echoes. Each finger is tuned to a particular multi-path echo. By estimating the channel effects, e.g., phase and attenuation, and by properly accounting for the differences in path delays, the individual output from each RAKE finger may be combined with the outputs from the other fingers to provide a combined RAKE output signal with a greatly improved signal-to-noise ratio (SNR).

In DS-CDMA systems, such as Wideband CDMA and IS-2000, high transmission data rates are achieved by transmitting data at a low spreading factor and/or on more than one spreading code (multi-code). When a low spreading factor and/or multi-code is used, performance is sensitive to multi-path dispersion. With dispersion, there are multiple echoes of the transmitted signal with different relative delays. These echoes interfere with one another. Not only is orthogonality lost between successive symbols as one symbol overlaps with the next, but orthogonality is also lost between symbols sent on different, orthogonal codes.

As a result, performance is often limited by interference between different symbols being sent to a particular user. These symbols can correspond to the previous or next symbol, symbols sent in parallel on another code carrier, or both. In general, this interference is referred to as self-interference, where self-interference may include intersymbol interference (ISI) or inter-code interference (ICI). A key aspect of ISI is that it varies from symbol to symbol. This variation is due to the spreading codes being a combination of Walsh codes and a common scrambling code. The scrambling code has a period much longer than the symbol period, which effectively changes the overall spreading code from symbol period to symbol period.

SUMMARY OF THE INVENTION

The present application discloses a method and apparatus for reducing interference, such as inter-symbol interference, from a symbol of interest in a RAKE receiver. The RAKE receiver comprises a plurality of RAKE fingers, a processor, and a combiner. The plurality of RAKE fingers despread symbols received over multiple paths of a multi-path channel. The processor determines cross-correlations between different symbols. The combiner combines the despread symbols using the cross-correlations to reduce interference from the symbol of interest.

DETAILED DESCRIPTION OF THE INVENTION

Figure 1:
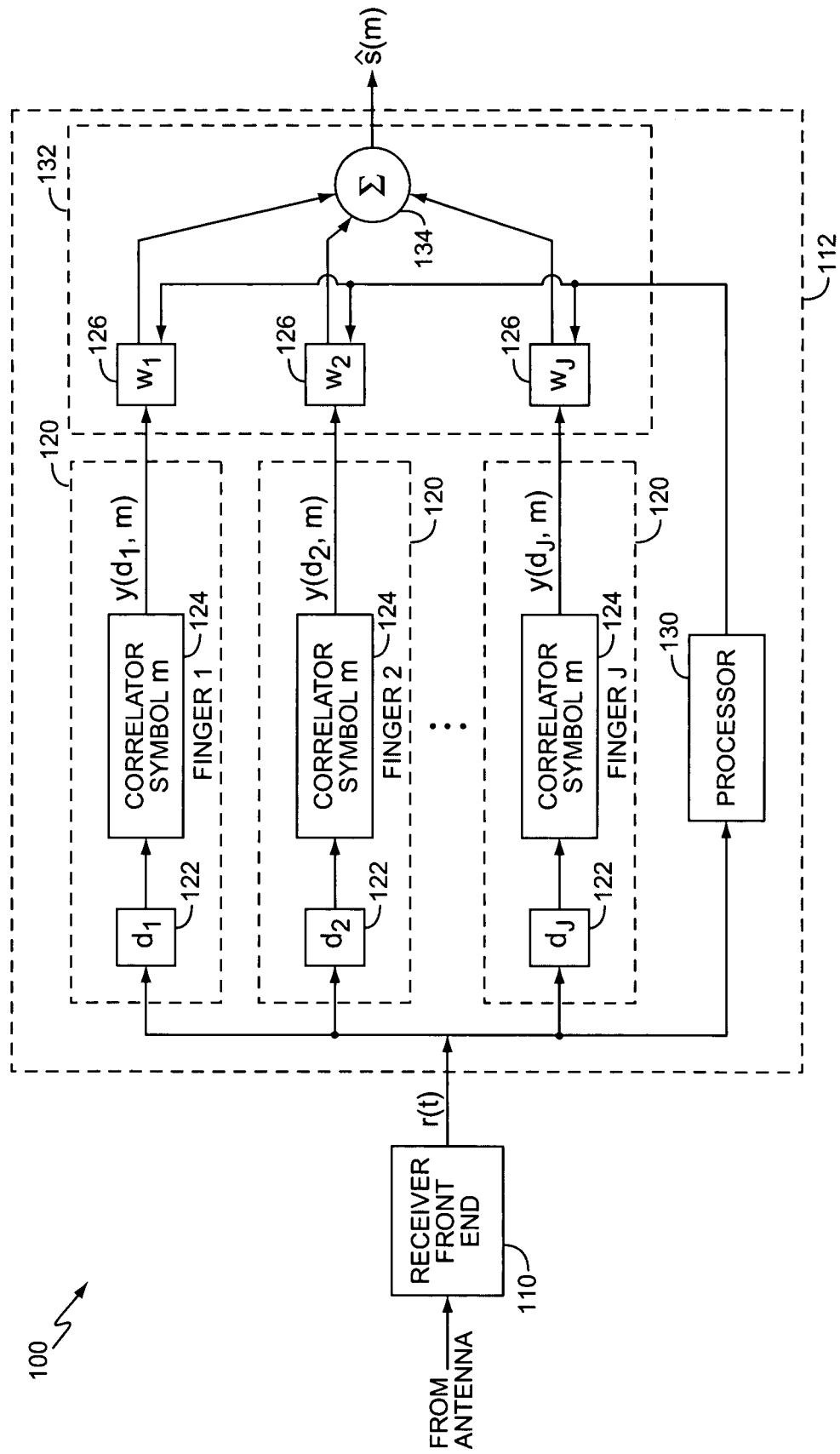
FIG. 1 comprises a block diagram of a conventional generalized RAKE (G-RAKE) receiver.

FIG. 1 illustrates a conventional wireless communication receiver 100 utilizing a generalized-RAKE (G-RAKE) 112. Wireless communication receiver 100 comprises receiver front end 110 and G-RAKE 112. The receiver 100 and/or the G-RAKE 112 may be embodied in an application specific integration circuit (ASIC). Receiver front end 110 outputs received signals r(t) to G-RAKE 112. These received signals r(t) comprise streams of sample values obtained from wireless signals received by one or more antennas associated with one or more receiver front ends 110. An exemplary front end 110 may include amplifiers, filters, mixers, digitizers, and/or other electronics as needed to produce a sampled signal suitable for processing by the G-RAKE 112. The received signal r(t) output to G-RAKE 112 typically comprises a composite signal that includes one or more multi-path echoes arising from multi-path propagation and which arrive at the receiver 100 from different directions and with different time delays. Further, received signal r(t) may include components transmitted from or received by different antennas (not shown). The task of the G-RAKE 112 is to generate an estimate $\hat{s}(m)$ of each transmitted symbol s(m) from the received signal r(t).

G-RAKE 112 comprises a plurality of RAKE fingers 120, RAKE processor 130, and RAKE combiner 132. Each RAKE finger 120 processes different time shifts or multi-path echoes of the received signal r(t). Typically, each RAKE finger 120 comprises a delay element 122 and a correlator 124. Delay elements 122 delay the received signal r(t) to time align the multi-path echoes processed by each RAKE finger 120. Correlators 124 correlate the delayed signals with a spreading code to extract the assigned multi-path echoes from the received signal r(t). Despread values from correlators 124 are combined in combiner 132. Combiner 132 typically includes weighting elements 126 and summer 134. Weighting elements 126 weight the multi-path echoes output from respective correlators 124. The weighted multi-path echoes are summed symbol-by-symbol by summer 134 to form an estimate of a symbol of interest, $\hat{s}(m)$, during each symbol period. While some of the figures refer to the estimated symbol of interest as $\hat{s}(m)$, throughout this specification the symbol of interest s(m) and the estimated symbol of interest $\hat{s}(m)$ may be represented by s(0) and $\hat{s}(0)$, respectively, where m=0, without loss of generality. Further, those skilled in the art will appreciate that the time shifts associated with delay elements 122 correspond to the delays of the multi-path echoes, while the combining weights associated with weighting elements 126 may correspond to the conjugates of the multiplying coefficients of the multi-path echoes (RAKE) or conjugates of weights that depend on the coefficients and a noise correlation matrix (G-RAKE).

In the conventional receiver 100 described above, the symbol estimates ŝ(m) output during each symbol period may be corrupted by interference, such as intersymbol interference (ISI), which may result in demodulation and decoding errors. The ISI may be due in part to the dispersive effects of the communication channel, and in part to cross-correlations between the spreading codes used for different symbols. It should be noted that the spreading code is a combination of an assigned Walsh code and a scrambling code. The period of the scrambling code is typically larger than a symbol period, so the net effect is a time-varying spreading code. The present invention uses knowledge of the communication channel and cross-correlations between spreading codes for different symbols to determine cross-correlations between symbols to reduce interference.

Figure 2:
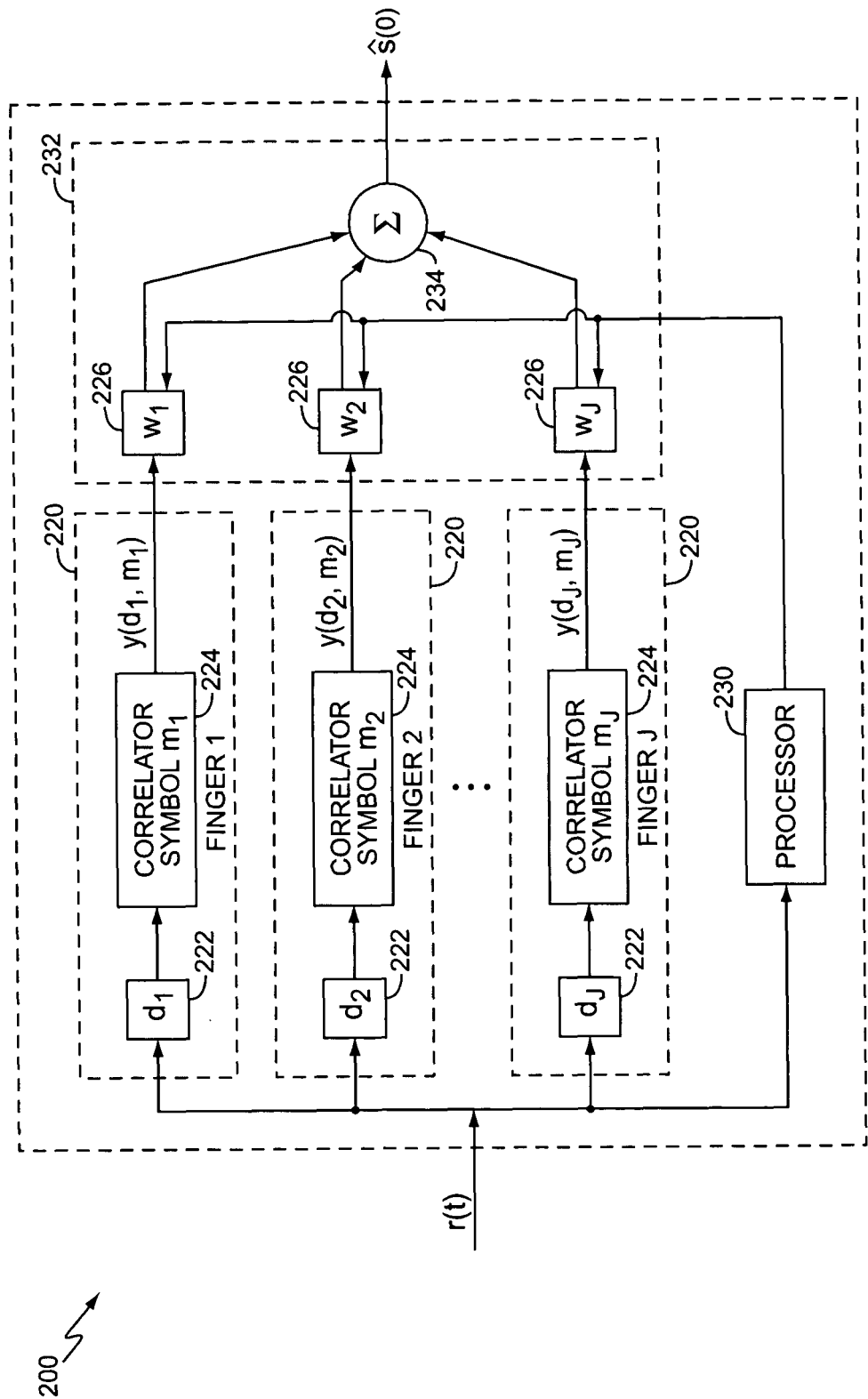
FIG. 2 comprises a block diagram of an exemplary multi-symbol RAKE (M-RAKE) receiver according to the present invention.

FIG. 2 illustrates an exemplary multi-symbol RAKE (M-RAKE) 200 according to the present invention. As with the G-RAKE 112, M-RAKE 200 may be embodied in an ASIC. M-RAKE 200 comprises a plurality of RAKE fingers 220, a RAKE processor 230 and a RAKE combiner 232. Unlike the RAKE fingers 120 of G-RAKE 112, RAKE fingers 220 may despread symbols from different symbol periods. Typically, one or more RAKE fingers 220 will have a delay that corresponds to a symbol of interest s(0). Other RAKE fingers 220 will have delays that correspond to interfering symbols (i.e. symbols near the symbol of interest that contribute to intersymbol interference). During each symbol period, weighting elements 226 weight the despread symbols output from corresponding correlators 224 to form weighted outputs, which are then summed in summer 234 to form a symbol estimate ŝ(0). RAKE processor 230 calculates the combining weights of weighting elements 226 to cancel or reduce intersymbol interference due to the effects of the communication channel and cross-correlations between spreading codes for different symbols.

The combining weights or weighting factors for M-RAKE 200 may be determined from a maximum likelihood (ML) or a minimum mean square error (MMSE) solution computed by RAKE processor 230 utilizing knowledge of the different symbol spreading sequences and the channel coefficients. Typically, these combining weights are based on an analysis of the correlator outputs. With many of the mathematical details and definitions deferred till later, the vector of correlator outputs may be represented as:

$$y = [\ y(d_1, m_1)\ \ y(d_2, m_2)\ \ \ldots\ \ y(d_J, m_J)\ ]^T \quad (1)$$
$$= h_0 s(0) + \sum_{i \neq 0} h_i s(i) + n,$$

where $y(d_j, m_j)$ corresponds to the output of delay element J and correlator J, $$h_0 s(0) + \sum_{i \neq 0} h_i s(i)$$

represents the vector output components associated with each transmitted symbol, and n represents a noise output vector (thermal noise, other interference). Generally speaking $h_i$ comprises the composite channel impulse response associated with the $i^{th}$ symbol, s(i), which includes the channel effects and despreading (spreading sequence cross-correlations). The first term in Eq. (1) represents the symbol of interest and the summation in Equation 1 represents the contribution of all other symbols, or the ISI, in y.

The symbol of interest, s(0), is estimated by using a linear combination of the outputs of RAKE fingers 220, which may be represented as $\hat{s}(0) = w^H y$, where $w^H$ is the conjugate transpose of a weight solution vector w. The linear combination is performed in RAKE combiner 232 by weighting elements 226 and summer 234.

The weight solution vector, w, based on a maximum likelihood criterion for the estimate, may be calculated by:

$$w = R_u^{-1} h_0, \quad (2)$$

where $R_u$ is the correlation matrix of all undesired components in Equation 1. Correlation matrix $R_u$ may be calculated by taking the expectation with respect to noise and random transmitted symbols (assuming the random transmitted symbols are independent). The resulting correlation matrix of the undesired components may be represented by:

$$R_u = \sum_{i \neq 0} h_i h_i^H + R_n, \quad (3)$$

where $R_n$ is the correlation matrix of the noise, which may be correlated across fingers after the despreading process. The calculation of the noise correlation matrix $R_n$ is shown below. Because the expectation is taken over random transmitted symbols, instead of the known spreading codes, the combining weights applied by weighting elements 226 will change each symbol period due to the time-varying nature of the spreading waveform.

The derivation of the correlator outputs defined in Equation 1 will now be described. The transmitted signal for a single code channel may be defined as:

$$x(t) = \sqrt{E} \sum_{i=-\infty}^{\infty} s(i) a_i(t - iT), \quad (4)$$

where E is the symbol energy, and s(i) and $a_i(t)$ are the $i^{th}$ symbol and its spreading waveform, respectively. The spreading waveform $a_i(t)$ is composed of a complex sequence of code chips convolved with a pulse shape. It is assumed that the spreading waveform is normalized so that $$\int_{-\infty}^{\infty} |a_i(t)|^2 \, dt = 1.$$

If the multi-path channel is discrete and comprises L rays, then $$g(t) = \sum_{l=1}^{L} g_l \delta(t - \tau_l) \quad (5)$$

represents its impulse response where $g_l$ and $\tau_l$ are the complex gain coefficient and delay of the $l^{th}$ ray, respectively. The signal received through this channel may be represented by:

$$r(t) = \sqrt{E} \sum_{l=1}^{L} \sum_{i=-\infty}^{\infty} g_l s(i) a_i(t - iT - \tau_l) + n(t), \quad (6)$$

where n(t) is a complex noise process.

The finger of a RAKE receiver incorporates a delay, d, which precedes a correlator matched to the spreading waveform of the $m^{th}$ symbol, $a_m(t)$. The output of the finger may be given as:

$$y(d, m) = \int_{-\infty}^{\infty} r(\alpha + d) a_m^*(\alpha) d\alpha \quad (7)$$

$$= \sqrt{E} \int_{-\infty}^{\infty} \sum_{l=1}^{L} \sum_{i=-\infty}^{\infty} g_l s(i) a_i(\alpha + d - iT - \tau_l)$$

$$a_m^*(\alpha) d\alpha + \tilde{n}(d, m),$$

where $\tilde{n}(d,m)$ is the complex noise output of the correlator. Assuming that the symbol of interest is s(0), the traditional RAKE would have m=0 and the delays of the fingers would be matched to the delays of the resolvable rays of the multi-path. However, for the M-RAKE 200 of the present invention, the spreading waveform used for correlation may be generalized to be any symbol's spreading waveform. Equation 7 may be rewritten as:

$$y(d, m) = \int_{-\infty}^{\infty} r(\alpha + d) a_m^*(\alpha) d\alpha \quad (8)$$

$$= \sqrt{E} \int_{-\infty}^{\infty} \sum_{l=1}^{L} \sum_{i=-\infty}^{\infty} g_l s(i) a_i(\alpha + d - iT - \tau_l)$$

$$a_m^*(\alpha) d\alpha + \tilde{n}(d, m)$$

$$= \sqrt{E} \sum_{i=-\infty}^{\infty} s(i) \sum_{l=1}^{L} g_l R_{i,m}(d - iT - \tau_l) + \tilde{n}(d, m)$$

$$= \sum_{i=-\infty}^{\infty} h_i(d - iT, m) s(i) + \tilde{n}(d, m)$$

where $$\tilde{n}(t, m) = \int_{-\infty}^{\infty} n(\alpha + t) a_m^*(\alpha) d\alpha \quad (9)$$

is the colored noise output of the correlator, and $$R_{i,m}(t) = \int_{-\infty}^{\infty} a_i(\alpha + t) a_m^*(\alpha) d\alpha \quad (10)$$

is the correlation of the $i^{th}$ symbols spreading waveform against the $m^{th}$ symbol's spreading waveform, used by the finger's correlator. Finally, the components associated with a particular symbol (a correlation between symbol m and i) may be grouped together into $$h_i(t, m) = \sum_{l=1}^{L} g_l R_{i,m}(t - \tau_l), \quad (11)$$

a net channel impulse response for the $i^{th}$ symbol, where spreading code and pulse shape information provides $R_{i,m}(t)$ and channel estimation is used to get $g_l$.

Finally, the RAKE finger outputs may be vectorized for the detection of the symbol of interest as:

$$y = [y(d_1, m_1), y(d_2, m_2), \ldots, y(d_j, m_j)]^T \quad (12)$$

where there are J RAKE fingers 220. In a traditional matched filter case, J=L, the number of resolvable rays in the multi-path channel. Also, J>L fingers may be used.

The calculation of the noise covariance or correlation matrix $R_n$ referenced in Equation 3 is computed in one of two ways. In the first way, the noise correlation matrix represents white noise, n(t), which has been colored by the correlation process (filtering) of the RAKE fingers 220 to produce $\tilde{n}(d, m)$, where the noise is a function of the delay d of the RAKE finger 220 and the particular spreading waveform of symbol m used by the correlator 224.

Defining the noise output vector of the RAKE fingers 220 as $$n = [\tilde{n}(d_1, m_1) \, \tilde{n}(d_2, m_2) \ldots \tilde{n}(d_j, m_j)]^T, \quad (13)$$

the noise correlation matrix may be represented by:

$$R_n = E\{nn^H\}. \quad (14)$$

The cross-correlation of the $i^{th}$ finger and the $j^{th}$ finger may be given as:

$$R_n(i, j) = E\{\tilde{n}(d_i, m_i) \tilde{n} * (d_j, m_j)\} \quad (15)$$

$$= E\left\{ \int_{-\infty}^{\infty} n(\alpha + d_i) a_{m_i}^*(\alpha) d\alpha \int_{-\infty}^{\infty} n*(\beta + d_j) a_{m_j}(\beta) d\beta \right\}$$

$$= \int_{-\infty}^{\infty} \int_{-\infty}^{\infty} a_{m_i}^*(\alpha) a_{m_j}(\beta) E\{n(\alpha + d_i) n*(\beta + d_j)\} d\alpha d\beta.$$

Because the noise is white, $E\{n(t)n^*(t+\tau)\} = \sigma^2 \delta(t-\tau)$, where $\sigma^2$ is the noise power, Equation 15 becomes:

$$R_n(i, j) = \int_{-\infty}^{\infty} \int_{-\infty}^{\infty} a_{m_i}^*(\alpha) a_{m_j}(\beta) \sigma^2 \delta(\alpha + d_i - \beta - d_j) d\alpha d\beta. \quad (16)$$

Sifting property of the $\delta(\cdot)$ function in integration results in:

$$R_n(i, j) = \sigma^2 \int_{-\infty}^{\infty} a_0^*(\alpha) a_0(\alpha + d_i - d_j) d\alpha \quad (17)$$

$$= \sigma^2 R_{m_j, m_i}(d_i - d_j).$$

Thus, the noise covariance can be constructed using spreading code cross-correlation information and noise power estimates ($\sigma^2$). The latter can be estimated by using known techniques. When interference from other user signals is present (i.e., not modeled as ISI or ICI), then the noise at the receive antenna may not be white. A second way to compute the noise covariance matrix is to estimate noise correlations using despread values. For example, the model in Equation 1 also applies to the pilot symbols being sent on the pilot channel. This model can be used to obtain vectors of noise samples, n, by subtracting the pilot symbol contributions from the y vector. Outer products of the noise sample vectors can be formed and smoothed in time to give an estimate of the noise covariance matrix. As this matrix is Hermitian symmetric, only the upper or lower triangle of the matrix needs to be estimated.

Figure 3:
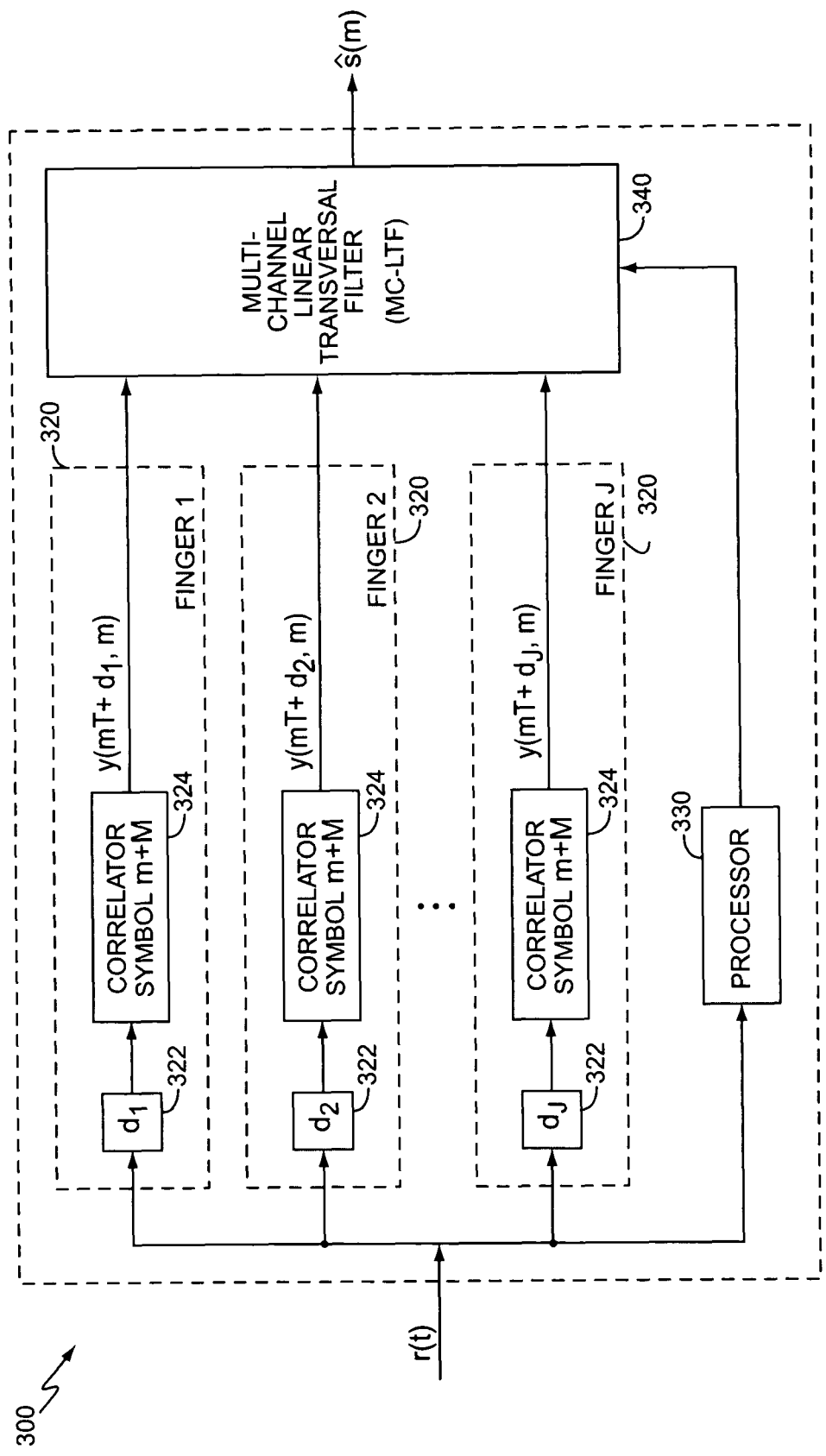
FIG. 3 comprises a block diagram of an exemplary restricted M-RAKE receiver according to the present invention.
Figure 4:
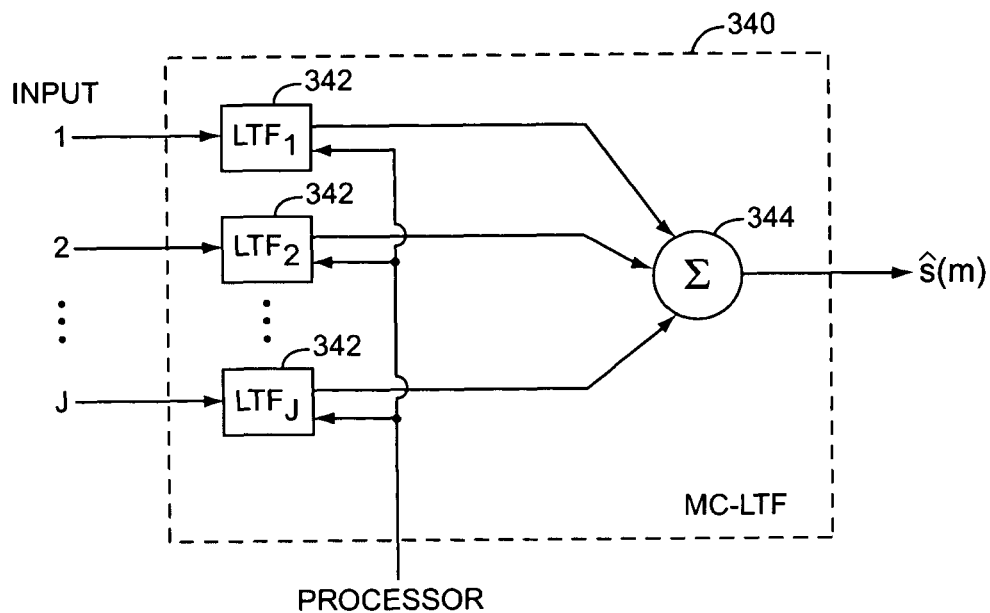
FIG. 4 illustrates an exemplary multi-channel linear transversal filter for the restricted M-RAKE of FIG. 3.

Turning now to FIG. 3, an alternate embodiment of the present invention, referred to herein as a restricted M-RAKE 300, will now be discussed. Restricted M-RAKE 300 comprises a plurality of RAKE fingers 320 and a multi-channel linear transversal filter (MC-LTF) 340. In restricted M-RAKE 300, each RAKE finger 320 includes a delay element 322 and a correlator 324. In this embodiment, the delays associated with each RAKE finger 320 are chosen so that the despread symbols output from each correlator 324 are time aligned. The despread symbols output from RAKE fingers 320 are input to the MC-LTF 340. As shown in FIG. 4, the MC-LTF 340 comprises a plurality of parallel linear transversal filters (LTFs) 342, each associated with a corresponding RAKE finger 320, and a summer 344 that adds the filtered outputs of each LTF 342 to generate a symbol estimate ŝ(m). Those skilled in the art will appreciate that other embodiments of the MC-LTF 340 are possible. In general, past finger outputs are stored and results from multiple fingers and multiple symbol periods are combined.

Figure 5:
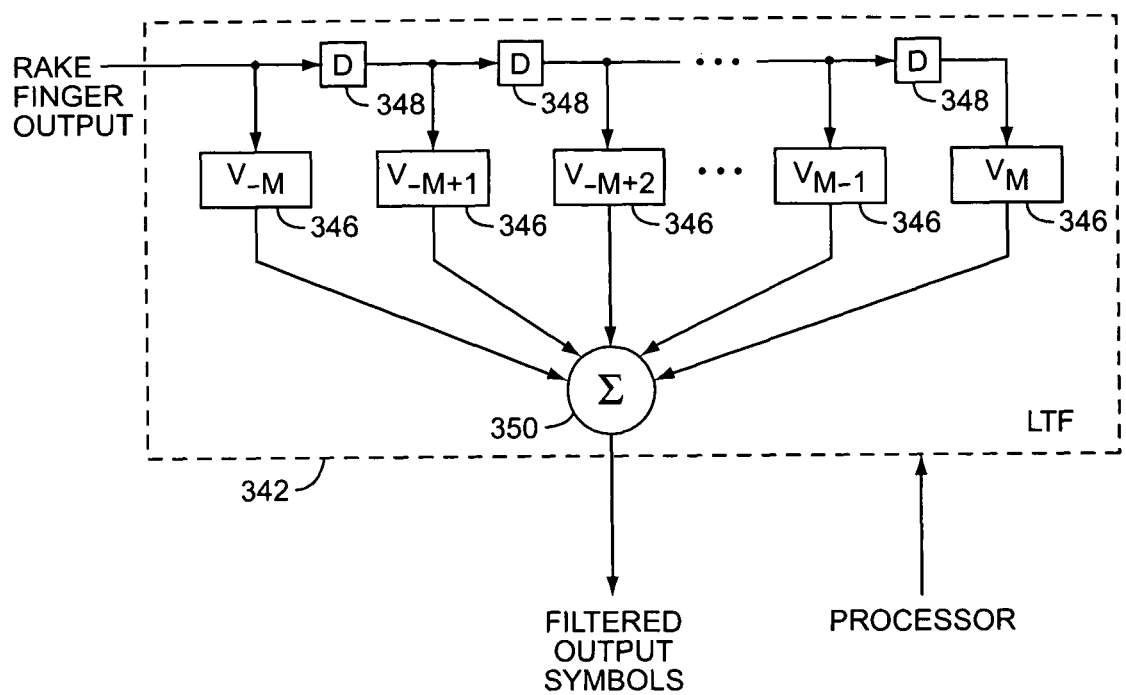
FIG. 5 illustrates an exemplary linear transversal filter for the multi-channel linear transversal filter of FIG. 4.

Each LTF 342 combines despread symbols output from a corresponding RAKE finger 320 during a plurality of successive symbol periods as shown in FIG. 5. The despread symbols combined by each LTF 342 include a symbol of interest and the nearby interfering symbols (both preceding and succeeding the symbol of interest) that contribute to ISI. The function of the LTFs 342 is to reduce the ISI in the symbol of interest as described in greater detail below. The filtered signals output from each LTF 342, referred to herein as the filtered output signals, are added by multi-path summer 344 to generate the symbol estimates. The summer 344 performs a similar function as a summer in a conventional RAKE receiver to improve the signal to noise ratio of the final symbol estimates.

Each LTF 342 comprises 2M+1 weighting elements 346, 2M delay elements 348, and LTF summer 350, where M represents the length of the ISI in symbol periods. Thus, when M equals 2, there will be four interfering symbols (two preceding and two succeeding) surrounding a symbol of interest s(m). LTF 342 receives and delays the despread symbols output from a corresponding RAKE finger 320 in a tapped delay line comprising a plurality of delay elements 348. The despread symbols may be corrupted by ISI. During each symbol period, the LTF 342 weights and combines the despread symbols output during 2M+1 symbol periods centered on the symbol of interest s(m) in weighting elements 346 and LTF summer 350. The weighting factor for each weighting element 346 is solved for jointly in a single step by processor 330 based on the channel coefficients and the cross-correlation between spreading codes, as described further below.

Restricted M-RAKE 300 reduces the number of RAKE fingers 320 while providing the same RAKE finger outputs typically provided by a larger number of RAKE fingers 220 in the M-RAKE 200 shown in FIG. 2. For example, assume a restricted M-RAKE 300 comprises four RAKE fingers 320, where each RAKE finger output is fed into a multi-channel LTF 340 spanning ±1 symbols (M=1) around the desired symbol. This exemplary M-RAKE 300 is equivalent to a non-restricted M-RAKE 200 with 12 RAKE fingers 220. Thus processing advantages may be accomplished with restricted M-RAKE 300.

Figure 6:
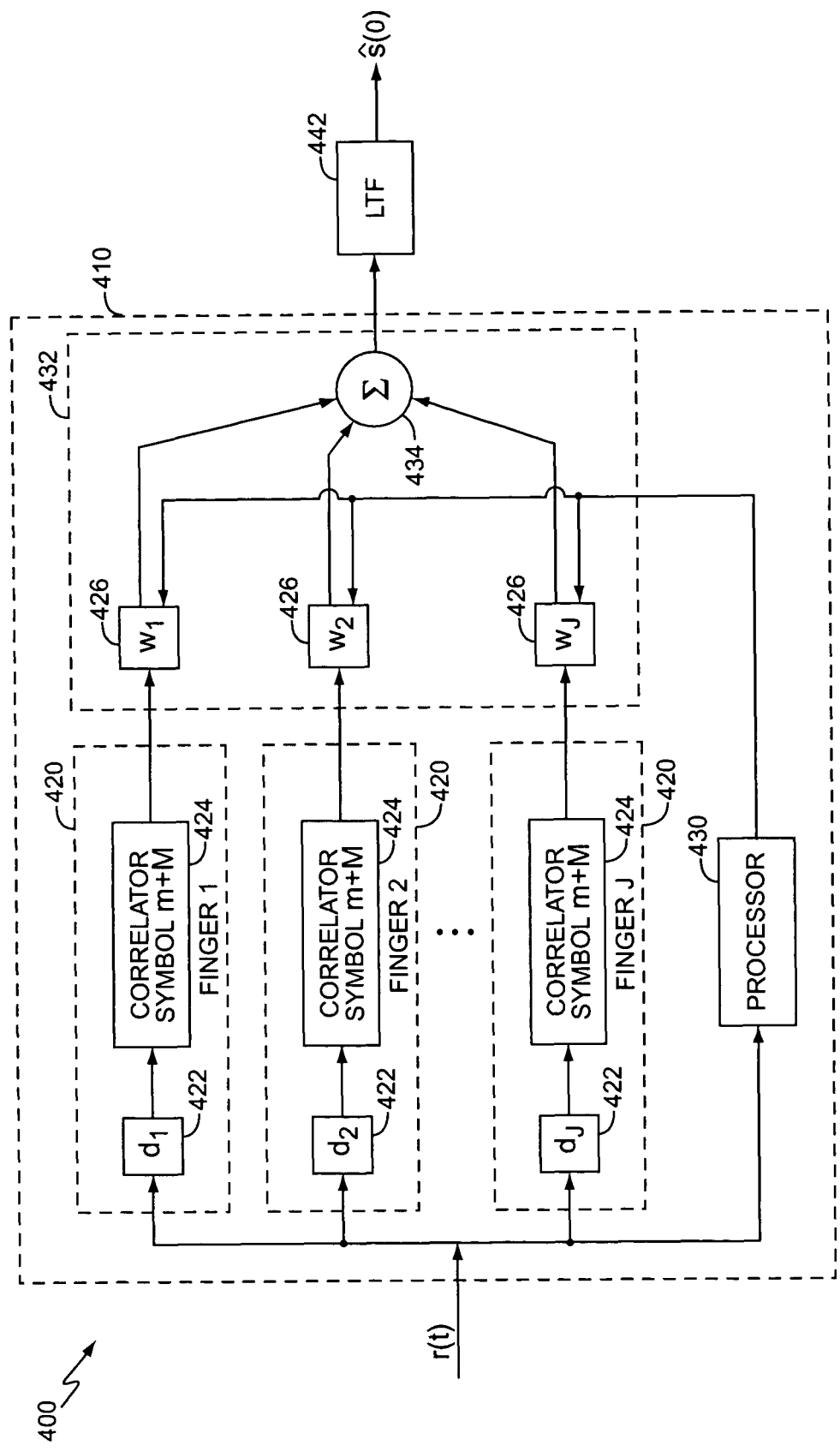
FIG. 6 illustrates an exemplary linear equalizer according to the present invention.

FIG. 6 shows a linear equalizer (LEQ) 400 constructed in accordance with the present invention. LEQ 400 comprises a generalized RAKE (G-RAKE) 410 and a linear transversal filter 442 to combine successive outputs from the G-RAKE 410. Those skilled in the art will understand that the G-RAKE 410 may use a variety of combining methods, including traditional RAKE combining. G-RAKE 410 comprises a plurality of RAKE fingers 420, a RAKE processor 430, and a RAKE combiner 432. Each RAKE finger 420 comprises a delay element 422 and a correlator 424. Like the restricted M-RAKE 300 of FIG. 3, the delays associated with each RAKE finger 420 are chosen so that the despread symbols output from each correlator 424 are time aligned. The outputs of correlators 424 are weighted in weighting elements 426 and summed by summer 434 to form a RAKE output signal. The RAKE output signal from combiner 432 is input to LTF 442. As with the restricted M-RAKE 300 discussed above, the delay length of the LTF 442 is 2M+1 symbols centered about the symbol of interest s(m). During each symbol period, LTF 442 combines 2M+1 RAKE output signals to generate a symbol estimate. The RAKE output signals are combined using weighting factors determined based on channel coefficients and cross-correlations between spreading codes to reduce ISI from the symbol of interest s(m).

The weighting factors for the LTF 442 are determined according to essentially the same ML criteria way as with the M-RAKE 200, with some redefining of the data vectors in question. As the RAKE finger outputs are stored in LTF 442, the vector of RAKE finger outputs are redefined according to the time they were produced. That is, the outputs of correlators 424, previously defined in Equation 1, may be rewritten as:

$$y(mT) = [y(mT + d_1, m) y(mT + d_2, m) \ldots y(mT + d_j, m)] \quad (18)$$
$$= h_0(mT)s(0) + \sum_{i \neq 0} h_i(mT)s(i) + n(mT),$$

where $h_i(mT)$ is the response from the $i^{th}$ symbol seen in the $m^{th}$ RAKE finger output vector, and where the symbol of interest is represented by $s(0)$. The output of combiner 432 comprises the $m^{th}$-combined output of the RAKE finger outputs and may be defined as:

$$z(mT) = g^H y(mT), \quad (19)$$

where, for example, the weighting and combining process simply comprises the complex conjugate of the coefficients of the channel taps in the dispersive channel, (traditional RAKE) $g = [g_1 \ g_2 \ldots g_L]^T$. The contents of the LTF 442 may be represented in vector form as:

$$z = [z(-MT) z(-(M-1)T) \ldots z(MT)]^T \quad (20)$$
$$= h'_0 s(0) + \sum_{i \neq 0} h'_i s(i) + n',$$

Equation 20 has the same general form as Equation 1, with the components of the various symbols and noise separated. The estimate $\hat{s}(m)$ of the symbol of interest may be represented as:

$$\hat{s}(0) = v^H z. \quad (21)$$

The weight vector, v, in LTF 242 may be calculated by:

$$v = R_{u'}^{-1} h'_0 \quad (22)$$

where the cross-correlation matrix $R_{u'}$ of the undesired portion of the signal may be given as:

$$R_{u'} = \sum_{i \neq 0} h'_i h'^H_i + R_{n'}. \quad (23)$$

The cross-correlation matrix $R_{u'}$ describes cross-correlations between the effective spreading codes for different symbols. Details regarding the calculation of the noise correlation matrix $R_{n'}$ are discussed further below. As with the M-RAKE 200 of FIG. 2, the weighting factors calculated according to the ML criteria change each symbol period due to the change in the spreading waveform.

Substituting Equation 18 into Equation 19 produces:

$$z(mT) = g^H y \quad (24)$$
$$= g^H h_0(mT)s(0) + \sum_{i \neq 0} g^H h_i(mT)s(i) + g^H n(mT),$$

from which the vector z may be written as:

$$z = \begin{bmatrix} z(MT) \\ \vdots \\ z(-MT) \end{bmatrix} \quad (25)$$
$$= \begin{bmatrix} g^H h_0(MT) \\ \vdots \\ g^H h_0(-MT) \end{bmatrix} s(0)$$
$$= \sum_{i \neq 0} \begin{bmatrix} g^H h_i(MT) \\ \vdots \\ g^H h_i(-MT) \end{bmatrix} s(i) + \begin{bmatrix} g^H n(MT) \\ \vdots \\ g^H n(-MT) \end{bmatrix}$$

From this $h'_i$ may be defined as $$h'_i = [g^H h_i(MT) g^H h_i((M-1)T) \ldots g^H h_i(-MT)]^T, \quad (26)$$

and the noise vector, n', as:

$$n' = [g^H n(MT) g^H n((M-1)T) \ldots g^H n(-MT)]^T. \quad (27)$$

This noise vector n' may be rewritten as:

$$n' = \begin{bmatrix} g^H & 0^H & \cdots & 0^H \\ 0^H & g^H & \cdots & 0^H \\ \vdots & \vdots & \ddots & \vdots \\ 0^H & 0^H & \cdots & g^H \end{bmatrix} \begin{bmatrix} n(MT) \\ \vdots \\ n(-MT) \end{bmatrix} = G^H n'', \quad (28)$$

where this block diagonal matrix of channel coefficients may be defined as:

$$G = \begin{bmatrix} g & 0 & \cdots & 0 \\ 0 & g & \cdots & 0 \\ \vdots & \vdots & \ddots & \vdots \\ 0 & 0 & \cdots & g \end{bmatrix} \quad (29)$$

This allows the correlation matrix $R_{n'}$ of the noise vector, n', to be written as $$R_{n'} = E\{n' n''^H\} \quad (30)$$
$$= G^H E\{n'' n''^H\} G$$
$$= G^H R_{n''} G,$$

Equation 30 shows that $R_{n''}$ may be calculated element by element in the same manner in which $R_n$ was calculated (e.g., Equation 17 for the white noise case).

The present invention may also be utilized in multi-code receivers. Multi-code transmission results when multiple code channels are devoted to a single downlink receiver to increase data carrying capability. This is analogous to several separate simultaneous transmissions being received by a single receiver. As the receiver is bound to demodulate each of these code channels, it can use the results of the demodulation of one code channel to aid in the demodulation of another code channel. Further, because of the multi-codes received by the multi-code receiver, each demodulated symbol may, in addition to ISI, be susceptible to inter-code interference (ICI) caused by symbols from adjacent codes.

For example, the M-RAKE 200 of FIG. 2 may be adapted to process multi-code signals by assigning a subgroup of RAKE fingers 220 to each code channel. While those skilled in the art will understand that tuning to the spreading codes of other code channels does not necessarily demodulate the other code channels, they will also appreciate that this tuning process provides information on the other code channels, which may help to reduce cross interference effects on the code channel of interest. In its most general form, the modified M-RAKE includes multiple subgroups of RAKE fingers 220 tuned to the spreading codes of different code channels. Further, these RAKE fingers 220 may be tuned to different symbol intervals and delays.

The restricted M-RAKE 300 of FIG. 3 may also be extended to multi-code by adding additional RAKE fingers 320 tuned to different code channels, with expansion of the MC-LTF 340 according to the number of added RAKE fingers 320. In this scenario, the joint solution of the weights within the MC-LTF 340 takes into account the spreading codes of all code channels.

Figure 7:
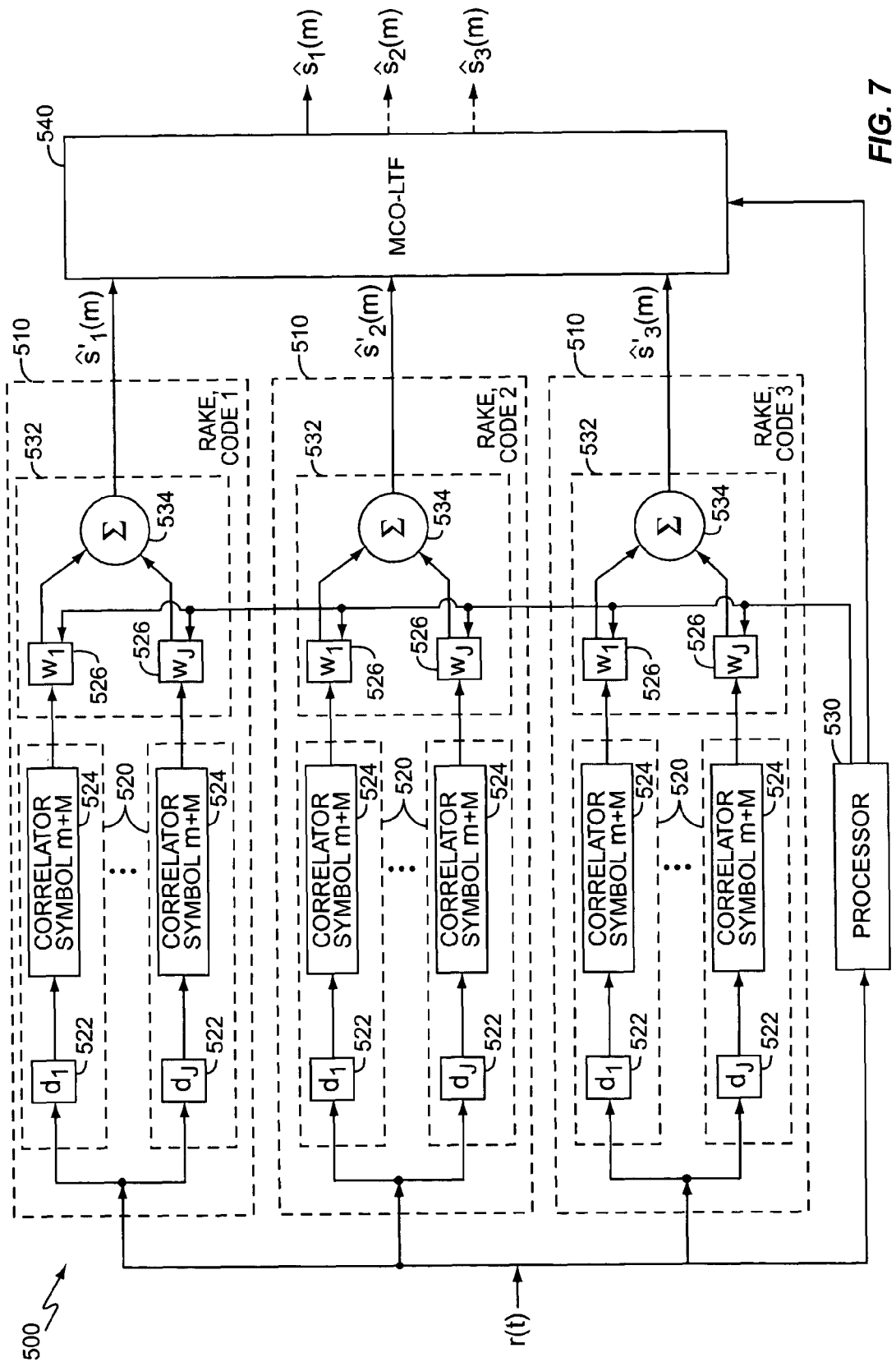
FIG. 7 illustrates an exemplary multi-code linear equalizer according to the present invention.

Similarly, the LEQ 400 of FIG. 6 may also be extended to multi-code by using a plurality of LEQs 400 tuned to different code channels and expanding the LTF 442 following each LEQ 400 to an MCO-LTF as shown in FIG. 7. The multi-code linear equalizer (MCO-LEQ) 500 comprises three G-RAKEs 510, each tuned to one of three code channels, a RAKE processor 530, and a multi-code linear transversal filter 540. Each G-RAKE 510 comprises a plurality of RAKE fingers 520 and a RAKE combiner 532. Each RAKE finger includes a delay element 522 and a correlator 524. The delays for the delay element 522 are chosen such that the output from each RAKE finger 520 is time aligned with the other RAKE fingers 520. Correlators 524 despread the received symbols, which are then weighted in weighting elements 526 and summed by summer 534. The weights applied by the weighting elements 526 are calculated in a conventional RAKE or G-RAKE manner as is well known in the art. The MCO-LTF 540 combines the RAKE output symbols from each G-RAKE 510 using weighting factors determined based on cross-correlations between symbols based on channel coefficients and cross-correlations between spreading codes as previously described. In the situation where all of the code channels are allocated to a single user, the MCO-LTF 540 outputs one symbol estimate for each code channel (co-channel). Thus, if there are three code channels, the MCO-LTF 540 would output three symbols per symbol period. In this case, the MCO-LFT 540 would reduce intersymbol interference attributable to symbols transmitted on the same code channel, as well as intercede interference due to symbols transmitted over different co-channels. The present invention, however, may also be used in the situation where each co-channel is allocated to a different user.

Figure 8:
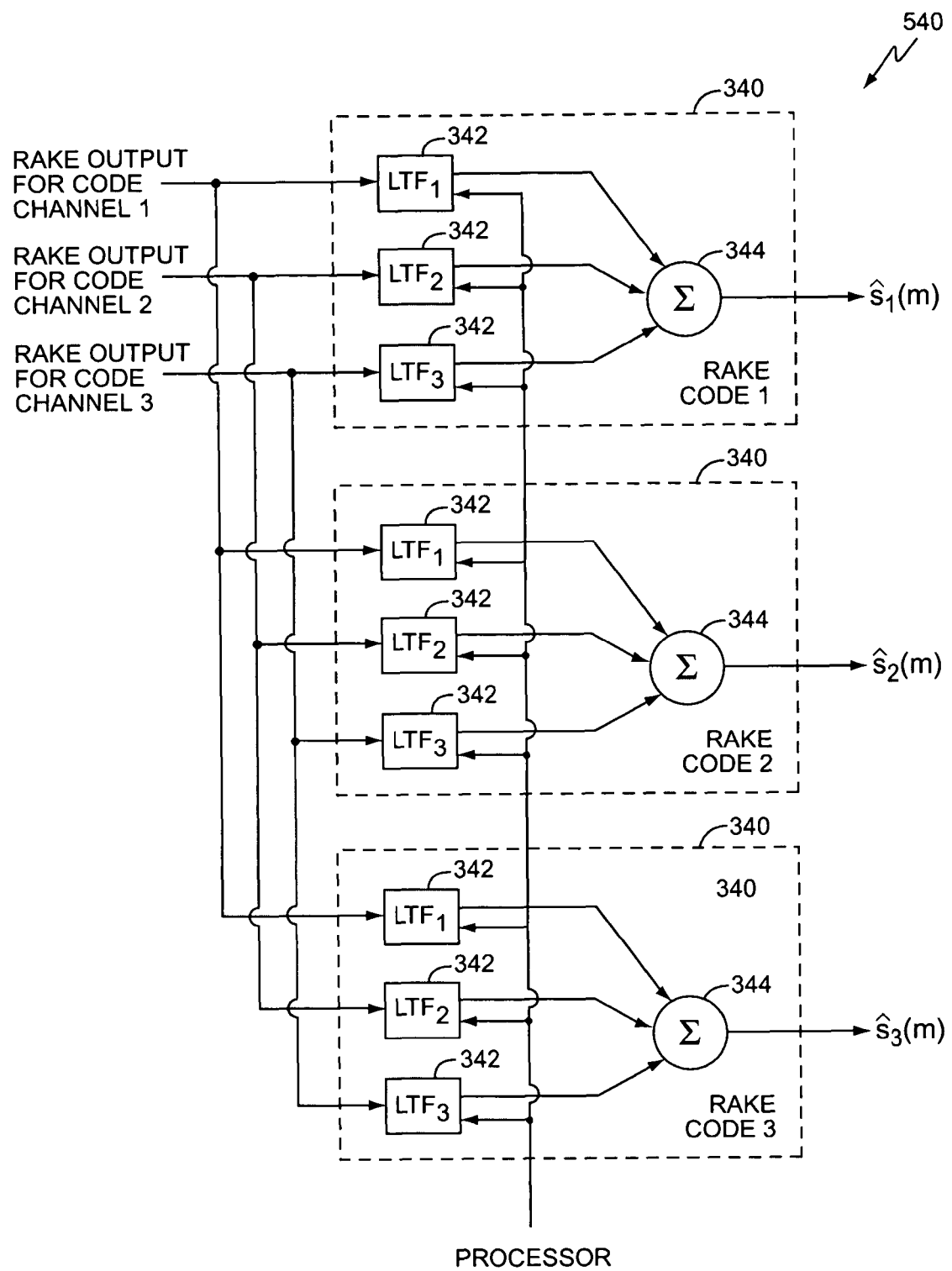
FIG. 8 illustrates an exemplary multi-channel filter for the multi-channel linear equalizer of FIG. 7.

FIG. 8 illustrates an exemplary MCO-LTF 540 corresponding to MC-LEQ 500 of FIG. 7. The MCO-LTF 540 may, in one embodiment of the invention, comprise a plurality of multi-channel linear transversal filters (MC-LTF) 340 as shown in FIG. 4. Each MC-LTF 340 combines RAKE output symbols from all of the G-RAKEs 510 using weighting factors determined based on channel coefficients and cross-correlations between symbols. Each MC-LTF 340 in the MCO-LTF 540 outputs a single symbol estimate corresponding to a selected one of the co-channels for each symbol period. The weighting factors for each LTF 342 would differ. For example, the weighting factors for the MC-LTF 340 associated with co-channel 1 would be selected to reduce interference from the symbols on co-channels 2 and 3. The same approach would be used for the MC-LTF 340 for co-channels 2 and 3, resulting in different weighting factors. Note that the LTF units that store the same RAKE outputs may share memory to reduce memory requirements.

As discussed above, the weighting factors for LTF 342 may be determined according to an ML solution. However, computational savings may be achieved if the ML solution is calculated as a minimum mean squared error (MMSE) solution, and then converted to a ML solution through a scaling of the combining weights (or final output), which can be calculated from elements of the MMSE solution.

It is straightforward to show that for a single user detection RAKE receiver 200, 300, 400 the weight vector, w, ML combining of the RAKE finger outputs is the same as the MMSE weight vector solution, v, within a scaling factor. That is, $$w = av \quad (31)$$

where a is some real coefficient. This a coefficient essentially relates the reliability of the symbol estimate.

Examining first the single user case, the RAKE finger outputs may be written as:

$$y = h_0 s(0) + \sum_{i \neq 0} h_i s(i) + n, \quad (32)$$

where $h_i$ is the net response across the fingers of the $i^{th}$ symbol, s(i), through spreading, channel, and despreading. The noise vector n represents the vectorized output of multiple fingers with white noise as the input. Without loss of generality, $h_0 s(0)$ corresponds to the symbol of interest where m=0.

For the MMSE solution, the data correlation matrix, $R_y = E\{yy^H\}$, may be used to solve for the familiar expression $$v = R_y^{-1} h_0, \quad (33)$$

where $h_0$ results from $E\{ys^*(0)\}$, with this expectation taken only over the symbols.

For the ML solution, the disturbance correlation matrix, $R_u$, is used, which is the data correlation matrix less the part related to the desired symbol, or $$R_u = R_y - h_0 h_0^H, \quad (34)$$

to solve for another similar, yet familiar expression $$w = R_u^{-1} h_0. \quad (35)$$

Equation 31 may be proven easily, starting with Equation 33 and using the fact of Equation 34:

$$\begin{aligned} v &= R_y^{-1} h_0 \\ &= R_u^{-1} R_u R_y^{-1} h_0 \\ &= R_u^{-1} [R_y - h_0 h_0^H] R_y^{-1} h_0 \\ &= [R_u^{-1} h_0] - [R_u^{-1} h_0] \cdot h_0^H [R_y^{-1} h_0] \\ &= w - w h_0^H v. \end{aligned} \quad (36)$$

Because $h_0^H v$ is a scalar, w may be written as:

$$w = \frac{v}{1 - h_0^H v}, \quad (37)$$

resulting in a scaling factor of:

$$a = \frac{1}{1 - h_0^H v}. \quad (38)$$

This scaling factor, a, is written in terms of an MMSE solution, with the assumption that it is desirable to convert an MMSE solution to an ML solution. That is, the terms for calculating a would already have been be calculated for the MMSE solution.

Other expressions for "a" can be used which account for the fact that the channel estimate may be a scaled version of the true channel coefficient, due to differences between the pilot and traffic channel power levels and spreading factors. Specifically, the factor "a" can be computed as $$a = \frac{\sqrt{A}}{1 - A h_0^H v} \quad (39)$$

where A corresponds to the ratio of the energy in a traffic symbol to the energy in the pilot symbol. For example, A may be expressed as $$A = r1 r2, \quad (40)$$

where r1 is the ratio of power allocated to the traffic channel to the power allocated to the pilot channel. This ratio can be estimated or set to some nominal value. Estimation of this ratio is addressed in Bottomley et al., "Communications methods, apparatus, and computer program products using gain multipliers," U.S. patent application Ser. No. 09/968,443, filed 1 Oct. 2001. Variable r2 represents the ratio of the spreading factor of the traffic channel to the spreading factor of the pilot channel (length of the pilot symbol used for channel estimation). These quantities are known at the receiver.

Regarding the multi-user/multi-code detection case, which may be used in the WCDMA multi-code transmission, parallel data channels sent to one user are considered as multiple user signals. Separate banks of RAKE fingers, each tuned to a user spreading sequence, can produce a vector of RAKE finger outputs, z, and these may be combined together to a vector symbol estimate, where the elements of the vector are the estimates of the individual user symbols. For the MMSE case, this may be represented by $\hat{s}_{MMSE} = V^H z$ and for the ML case, $\hat{s}_{MLSE}=W^H z$ where V and W are the MMSE and ML weight matrices, respectively. The same scaled relationship between the MMSE multi-user weight solution and the ML multi-user weight solution is not as obvious as in the single user case.

Now consider the multi-code/multi-user case, where there are K codes in parallel. The RAKE finger output vector may be given by:

$$z = \sum_{i \neq 0} \sum_{k=1}^{K} h_{i,k} s(i,k) + n \quad (41)$$

where $h_{i,k}$ is the net response of the $k^{th}$ user's $i^{th}$ symbol, $s(i,k)$. Again, n is the noise vector output from the fingers.

Solving jointly for a vector of user symbols $$s(i) = [s(i,1)\ s(i,2)\ \cdots\ s(i,K)]^T \text{ produces:} \quad (42)$$

$$\hat{s}_{MMSE}(0) = \begin{bmatrix} v_1^H z \\ v_2^H z \\ \vdots \\ v_K^H z \end{bmatrix} \quad (43)$$

$$= [v_1\ v_2\ \cdots\ v_K]^H z,$$

where $v_k$ is weight vector to provide the MMSE estimate of the $k^{th}$ user's symbol. This may be rewritten as a matrix V times the RAKE finger outputs $$\hat{s}_{MMSE}(0) = V^H z, \quad (44)$$

where $V=[v_1\ v_2\ \ldots\ v_K]$ and $\hat{s}_{MMSE}(0)$ represents the symbol of interest. It's straightforward to show that the joint MMSE solution that minimizes $\|s(0)-\hat{s}(0)\|^2$ is the same as the solution that minimizes the squared error of the individual estimates of the user's symbols, $|s(0,k)-\hat{s}(0,k)|^2$. As a result, the weight matrix for the joint MMSE solution, V, may be written as:

$$V = [R_y^{-1} h_{0,1}\ R_y^{-1} h_{0,2}\ \cdots\ R_y^{-1} h_{0,k}] \quad (45)$$
$$= [R_y^{-1} h_{0,1}\ h_{0,2}\ \cdots\ h_{0,k}]$$
$$= R_y^{-1} H_0,$$

where the net responses of the K users become the K columns of the matrix $H_0$, the 0 subscript denotes that this is the response for the desired $0^{th}$ symbol vector. Going forward, the 0 may be dropped for clarity, understanding that the response vectors for the $0^{th}$ symbol are being considered.

All of this vector and matrix manipulation provides a concise way of writing a joint MMSE solution. Assuming that this equation is solvable using matrix inversion, the implication of Equation 45 is that only a single matrix inversion needs to be calculated. For the ML solution, it is not obvious that this is the case. The vector ML solution may be written in much the same way as before $$\hat{s}_{ML}(0) = W^H z \quad (46)$$

where $W=[w_1\ w_2\ \ldots\ w_K]$. As a solution that gives us log likelihood ratios (LLR) for the bits of the individual users is desired, the estimates of the symbols to be ML individually is desired.

The weight matrix, W, for the ML solution may therefore be represented by:

$$W = [R_{u,1}^{-1} h_1\ R_{u,2}^{-1} h_2\ \ldots\ R_{u,K}^{-1} h_K], \quad (47)$$

where the disturbance correlation matrix for each user's ML weight vector solution may be different, as denoted $R_{u,k}$ for the $k^{th}$ user. Keeping the assumption that the weights using matrix inversion are being solved for, it would appear that it is necessary to calculate K different inverses to solve this system, as opposed to the single inverse matrix of the MMSE solution.

However, it should be noted that as in the single user case, the disturbance correlation matrix for the ML solution is the same as the MMSE data correlation matrix less the component from the desired symbol, that is $$R_{u,k} = R_y - h_k h_k^H. \quad (48)$$

It is recognized that the inverse of $R_{u,k}$ can be written as a "rank one update" inverse so, $$R_{u,k}^{-1} = R_y^{-1} + \frac{R_y^{-1} h_k h_k^H R_y^{-1}}{1 - h_k^H R_y^{-1} h_k}, \quad (49)$$

The $k^{th}$ column of W becomes:

$$w_k = R_y^{-1} h_k + \frac{R_y^{-1} h_k h_k^H R_y^{-1} h_k}{1 - h_k^H R_y^{-1} h_k} \quad (50)$$
$$= v_k + \frac{v_k h_k^H v_k}{1 - h_k^H v_k}$$
$$= v_k \left(1 - \frac{h_k^H v_k}{1 - h_k^H v_k}\right)$$
$$= \frac{v_k}{1 - h_k^H v_k},$$

and the same conclusion as for the single user case is achieved, although shown from a slightly different direction (using the rank one update). Then Equation 47 becomes:

$$W = [\lambda_1 v_1\ \lambda_2 v_2\ \ldots\ \lambda_K v_K] \text{ where} \quad (51)$$

$$\lambda_k = \frac{1}{1 - h_k^H v_k}, \quad (52)$$

and ultimately where:

$$W = V\Lambda \quad (53)$$

where $\Lambda$ is a diagonal matrix with $\lambda_k$ as the $k^{th}$ diagonal element.

Grouping these individual solutions in a matrix equation provides a concise expression in Equation 53, but it also points out important implementation points. Specifically, given a solution involving matrix inversion, it emphasizes that only a single inverse matrix is calculated for an MMSE solution as opposed to K inverse matrices for the ML solution, which may represent significant processing savings.

As discussed above and shown in Equation 54, the form of the MMSE solution is similar to the form of the ML solution.

$$v_{MMSE} = (R_z)^{-1} h'_o \quad (54)$$

However, the correlation matrix of the data, $R_z$ is used, rather than the correlation matrix of the disturbance or noise, $R_u$.

The form of the z vector of RAKE outputs for the $q^{th}$ symbol may be represented by:

$$z_q = [z(q-M)\, z(q-(M-1)) \ldots z(q+M)]^T, \quad (55)$$

where the symbol period, T, is dropped for convenience. This vector essentially represents the contents of the LTF 442 corresponding to the LEQ 400 discussed above. In another form, $z_q$ may be rewritten as:

$$z_q = [z(q-M)\, a_q]^T, \quad (56)$$

where most of the z vector is now represented by subvector $a_q$. Note that for the next symbol, q+1, the data is shifted through LTF 442, yielding:

$$z_{q+1} = [a_q\, z(q+M+1)]^T, \quad (57)$$

where $z(q+M+1)$ comprises the new combined RAKE output introduced into the filter.

As discussed above, the correlation matrix for the solution for the $q^{th}$ symbol may be represented by:

$$R_z(q) = E\{Z_q Z_q^H\}, \quad (58)$$

where $E\{\cdot\}$ is the statistical expectation operation, which in this case is taken only over the random noise. Substituting Equation 56 into Equation 58 results in:

$$R_z(q) = E\begin{bmatrix} z(q-M)z*(q-M) & z(q-M)a_q^H \\ a_q z*(q-M) & a_q a_q^H \end{bmatrix}. \quad (59)$$

Repeating this with Equation 57 for q+1 results in:

$$R_z(q+1) = E\begin{bmatrix} a_q a_q^H & a_q z(q+M+1) \\ z*(q+M+1)a_q^H & z(q+M+1)z*(q+M+1) \end{bmatrix}. \quad (60)$$

Figure 9A:
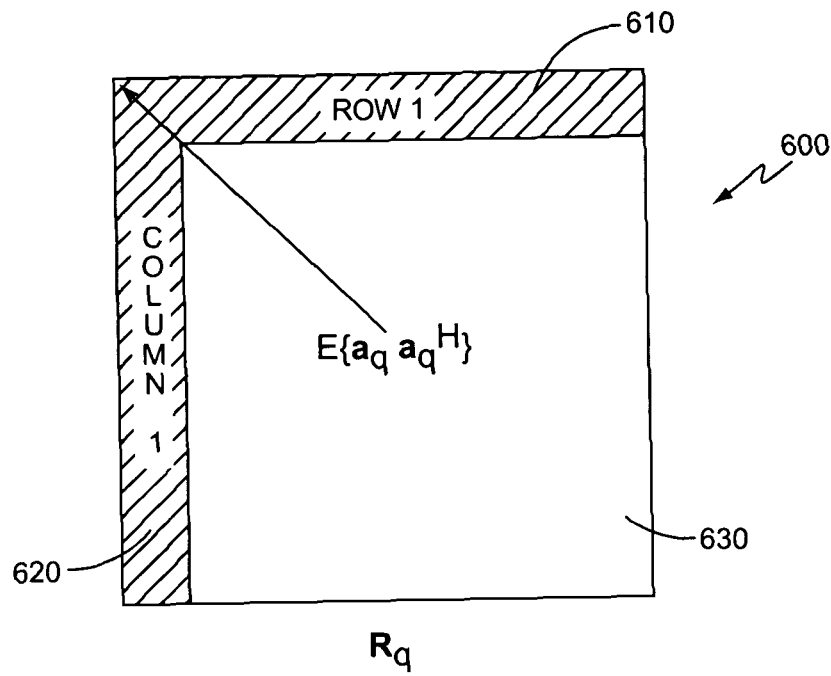
FIGS. 9A and 9B illustrate a mathematical technique for simplifying weight calculations associated with RAKE receivers.
Figure 9B:
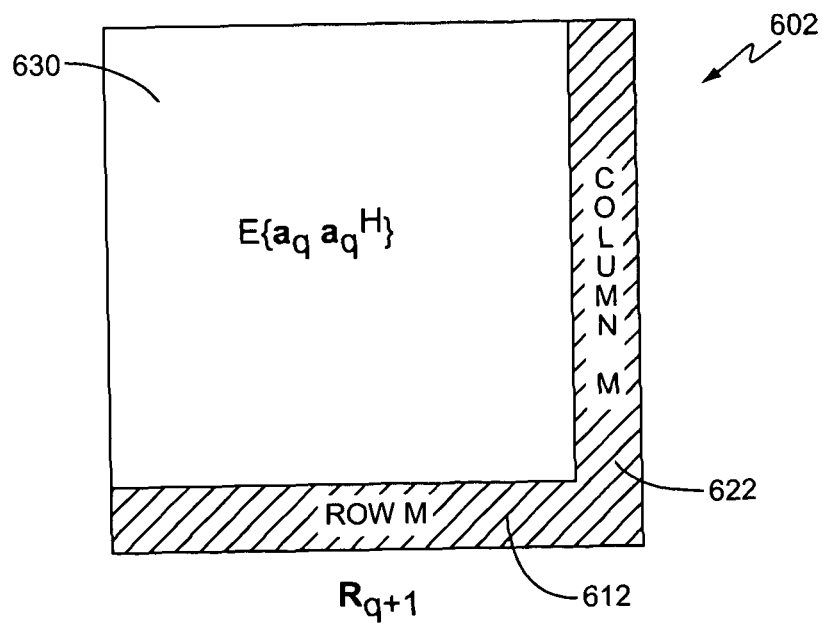

As shown in Equations 59 and 60, a submatrix $E\{a_q a_q^H\}$ appears in the correlation matrix for symbol q and q+1, indicating that it may be reused. Essentially, for each successive symbol sub-matrices $E\{a_q a_q^H\}$ may be shifted to partially form a new correlation matrix for the new symbol. FIGS. 9a and 9b illustrate the nature of this matrix shift. As shown in FIG. 9a, $R_q$ 600 comprises row one 610, column one 620, and submatrix $E\{a_q a_q^H\}$ 630. Row one 610 and column one 620 border the leftmost and uppermost boundaries of submatrix $E\{a_q a_q^H\}$ 630. Further, FIG. 9b illustrates that $R_{q+1}$ 602 comprises row M 612, column M 622, and submatrix $E\{a_q a_q^H\}$ 630. $R_{q+1}$ 602 may be generated from $R_q$ by shifting submatrix $a_q a_q^H$ 630 into the upper left-hand corner of $R_{q+1}$ 602. As a result, only row M 612 and column M 622 is calculated to complete $R_{q+1}$ 602. Depending on the size of R matrix, the computational savings may be substantial.

The MMSE solution allows for the special time varying structure of the data correlation matrix, $R_z$. As noted above, the variation of the spreading waveform necessitates the calculation of a new weight vector for each symbol period. This variation of the spreading waveform manifests itself in the changing of $h'_0$ and $R_z^{-1}$. However, $R_z$ does not completely change from symbol to symbol, and therefore, a substantial portion of $R_z$ may be reused. As a result, only a portion of $R_z$ needs to be calculated from scratch for each new symbol.

Further, in the multi-code scenario, the same MC-LEQ 500 with the same data contents may be used to solve for all K code channels at a given symbol instance. If the ML solution is used, the $R_u$ matrix is recalculated for each code channel because $R_u$ varies from code channel to code channel. However, with the MMSE solution, a single common data correlation matrix, $R_z$ may be calculated and used for all K solutions.

Figure 10:
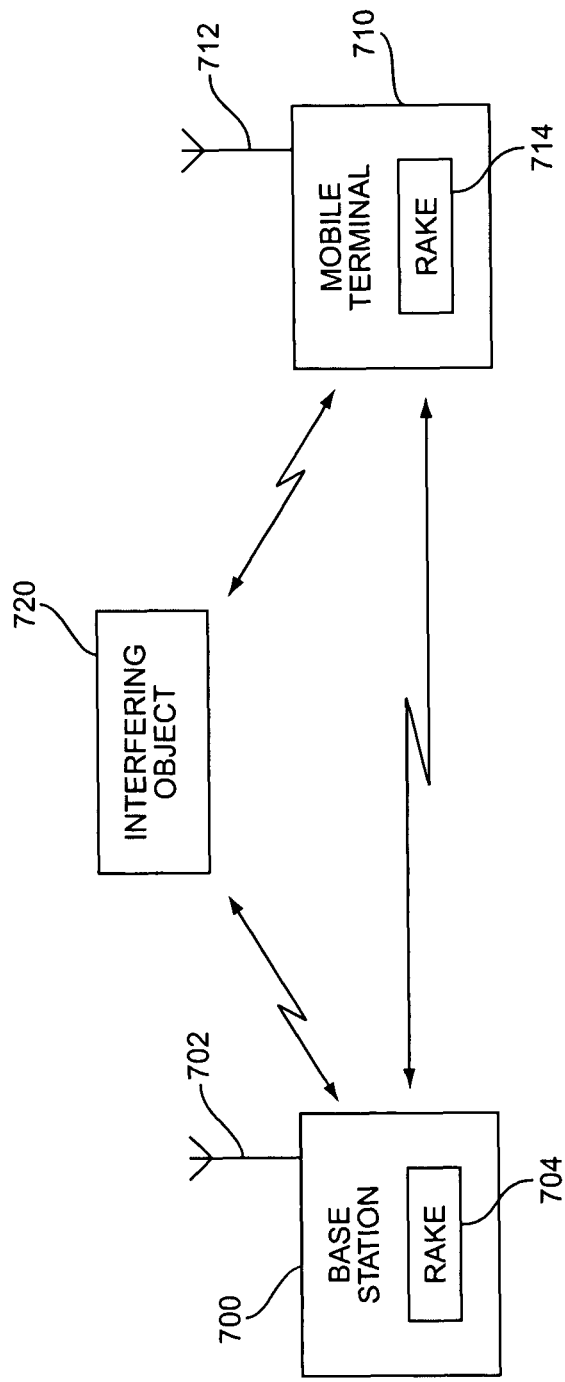
FIG. 10 illustrates an exemplary wireless communication system that utilizes the RAKE receivers of the present invention.

The RAKE receiver embodiments discussed herein may be disposed in any wireless communication device, such as a base station 700 or mobile terminal 710, as shown in FIG. 10. As used herein, the term "mobile terminal" may include a cellular radiotelephone with or without a multi-line display; a Personal Communications System (PCS) terminal that may combine a cellular radiotelephone with data processing, facsimile and data communications capabilities; a personal data assistant (PDA) that can include a radiotelephone, pager, Internet/intranet access, Web browser, organizer, calendar, and/or a global positioning system (GPS) receiver; and a conventional laptop and/or palmtop receiver or other appliance that includes a radiotelephone transceiver. Mobile terminals may also be referred to as "pervasive computing" devices.

Base station 700 includes antenna 702 for transmitting symbols to mobile terminal 710. Objects, such as interfering object 720 may cause multiple echoes of the transmitted symbols to arrive at mobile terminal 710 at different times, as described above. The symbols received at antenna 712 of mobile terminal 710 are then processed in RAKE receiver 714. RAKE receiver 714 represents any of the exemplary embodiments described above. Similarly, mobile terminal 710 may transmit symbols along multiple paths to base station 700. RAKE receiver 704 in base station 700 may then process the received symbols according to any of the exemplary embodiments described above.

In discussing exemplary embodiments of the present invention, it should be understood that one or more embodiments of the present invention comprise signal processing methods that may be implemented in hardware using discrete or integrated circuits, in software as stored program instructions, or in some combination thereof. More generally, one or more embodiments of the present invention may be embodied in hardware and/or software (including firmware, resident software, micro-code, etc.), including an application specific integrated circuit (ASIC).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

That which is claimed is:

1. A RAKE receiver comprising:
a plurality of RAKE fingers to despread symbols received over multiple paths of a multi-path channel, said received symbols comprising a symbol of interest and one or more interfering symbols, wherein a first one of said plurality of RAKE fingers comprises a delay corresponding to the symbol of interest and a second one of said plurality of RAKE fingers comprises a delay corresponding to an interfering symbol;
a processor to determine a cross-correlation between the symbol of interest and the interfering symbol; and
a combiner to combine the symbol of interest with the interfering symbol using the cross-correlation to reduce intersymbol interference attributable to the interfering symbol from the symbol of interest,
wherein the processor determines the cross-correlation between the symbol of interest and the interfering symbol by:

estimating channel coefficients for the paths of the multi-path channel;

computing spreading sequence cross-correlations; and determining the cross-correlation between the symbol of interest and the interfering symbol based on the estimated channel coefficients and the sequence cross-correlations.

2. The RAKE receiver of claim 1 wherein two or more of said plurality of RAKE fingers despread the same symbol received over different paths of the multi-path channel.

3. A method of reducing intersymbol interference from a symbol of interest comprising:

despreading symbols received over multiple paths of a multi-path channel, wherein the symbols include the symbol of interest and an interfering symbol;

determining a cross-correlation between the symbol of interest and the interfering symbol; and combining the symbol of interest with the interfering symbol using weighting factors determined based on the cross-correlation to reduce the intersymbol interference attributable to the interfering symbol from the symbol of interest, wherein determining the cross-correlation between the symbol of interest and the interfering symbol comprises:

estimating channel coefficients for the multiple paths of the multi-path channel;

computing spreading sequence cross-correlations; and determining the cross correlation between the symbol of interest and the interfering symbol based on the estimated channel coefficients and the sequence cross-correlations.

4. A RAKE receiver comprising:

a plurality of RAKE fingers to despread symbols received over multiple paths of a multi-path channel, wherein the symbols include a symbol of interest and at least one interfering symbol;

a processor to determine cross-correlations between the symbol of interest and the at least one interfering symbol; and a multi-channel filter to reduce intersymbol interference attributable to the at least one interfering symbol(s) from the symbol of interest by combining despread symbols from different symbol periods output by said plurality of RAKE fingers using weighting factors determined based on the cross-correlations between the symbols, said multi-channel filter comprising:

a plurality of linear transversal filters, each of which is associated with a corresponding one of the plurality of RAKE fingers, to weight and combine the despread symbols output by the corresponding one of the plurality of RAKE fingers over a plurality of symbol periods using weighting factors determined based on the cross-correlations between the symbols to generate a plurality of filtered output symbols; and a summer to combine the plurality of filtered output symbols to generate an estimate for the symbol if interest.

wherein the processor determines the cross-correlations between the symbol of interest and the at least one interfering symbol by:

estimating channel coefficients for the multiple paths of the multi-path channel;

computing spreading sequence cross-correlations; and determining the cross correlations between the symbol of interest and the at least one interfering symbol based on the estimated channel coefficients and the sequence cross-correlations.

5. The RAKE receiver of claim 4 wherein each of said linear transversal filter comprises:

a tapped delay line comprising a series of delay elements to delay the despread symbols output by the corresponding one of the plurality of RAKE fingers;

a plurality of weighting elements to weight corresponding ones of the delayed despread symbols by weighting factors determined based on the cross-correlations to generate weighted output symbols; and a summer to combine the weighted output symbols to generate the filtered output symbol.

6. A method of reducing intersymbol interference from a symbol of interest comprising:

despreading multiple symbols received over multiple paths of a multi-path channel;

determining cross-correlations between the symbol of interest and at least one interfering symbol;

combining the despread symbols received over the same path during a plurality of symbol periods using weighting factors determined based on the cross-correlations between symbols to generate a plurality of filtered output symbols; and combining the filtered output symbols to produce an estimate of the symbol of interest with reduced inter-symbol interference, wherein determining the cross-correlations between the symbol of interest and the at least one interfering symbol comprises:

estimating channel coefficients for the multiple paths of the multi-path channel;

computing spreading sequence cross-correlations; and determining the cross correlations between the symbol of interest and the at least one interfering symbol based on the estimated channel coefficients and the sequence cross-correlations.

7. The method of claim 6 wherein combining the despread symbols received over the same path during a plurality of symbol periods using weighting factors determined based on the cross-correlations between the symbols to generate a plurality of filtered output symbols comprises:

delaying the despread symbols received over the same path in a tapped delay line to generate a plurality of delayed symbols;

weighting each of the plurality of delayed symbols using the weighting factors determined based on the cross-correlations between symbols to generate a plurality of weighted symbols; and summing the weighted symbols to generate each of the plurality of filtered output symbols.

8. A RAKE receiver comprising:

a plurality of RAKE fingers to despread symbols received over multiple paths of a multi-path channel, said received symbols comprising a symbol of interest and one or more interfering symbols;

a processor to determine cross-correlations between symbols for the symbol of interest and at least one of the interfering symbols;

a RAKE combiner to combine the despread symbols received over different paths in the same symbol period to generate RAKE output symbols; and a second combiner to combine successive RAKE output symbols produced over a plurality of successive symbol periods using weighting factors determined based on the cross-correlations between the symbols to reduce intersymbol interference attributable to the at least one interfering symbol from the symbol of interest, wherein the processor determines the cross-correlations between the symbol of interest and the at least one of the interfering symbols by:
  estimating channel coefficients for the multiple paths of the multi-path channel;
  computing spreading sequence cross-correlations; and
  determining the cross correlations between the symbol of interest and the at least one of the interfering symbols based on the estimated channel coefficients and the sequence cross-correlations.

9. The RAKE receiver of claim 8 wherein said second combiner comprises:
  a tapped delay line comprising a series of delay elements to delay successive ones of the RAKE output symbols to generate a series of delayed output symbols;
  a plurality of weighting elements to weight corresponding ones of the delayed output symbols using the weighting factors determined based on the cross-correlations between the symbols to generate weighted output symbols; and
  a summer to combine the weighted output symbols to generate an estimate for the symbol of interest.

10. The RAKE receiver of claim 8 wherein the RAKE combiner comprises a G-RAKE combiner.

11. A method of reducing intersymbol interference from a symbol of interest comprising:
  despreading multiple symbols from different symbol periods received over multiple paths of a multi-path channel, said multiple symbols including the symbol of interest and at least one interfering symbol;
  determining cross-correlations between the symbol of interest and the at least one interfering symbol;
  RAKE combining the despread symbols received over different paths during the same symbol period to generate RAKE output symbols; and
  combining successive RAKE output symbols produced over a plurality of successive symbol periods using weighting factors determined based on the cross-correlations between the symbols to reduce intersymbol interference attributable to the at least one interfering symbol from the symbol of interest,
  wherein determining the cross-correlations between the symbol of interest and the at least one interfering symbol comprises:
    estimating channel coefficients for the multiple paths of the multi-path channel;
    computing spreading sequence cross-correlations; and
    determining the cross correlations between the symbol of interest and the at least one interfering symbol based on the estimated channel coefficients and the sequence cross-correlations.

12. The method of claim 11 wherein combining successive RAKE output symbols produced over a plurality of successive symbol periods comprises:
  delaying successive RAKE output symbols in a tapped delay line to generate a plurality of delayed output symbols;
  weighting each of the plurality of delayed output symbols using a weighting factor determined based on the cross-correlations between the symbols to generate a plurality of weighted output symbols; and
  summing the plurality of weighted output symbols to generate an estimate for the symbol of interest.

13. A multi-code RAKE receiver comprising:
  a plurality of parallel RAKE receivers providing RAKE output symbols for a plurality of code channels;
  a processor to determine cross-correlations between symbol spreading codes for a symbol of interest and at least one interfering symbol;
  a multi-channel filter to combine the RAKE output symbols to reduce interference attributable to the at least one interfering symbol from the symbol of interest, said multi-channel filter comprising:
    a plurality of linear transversal filters, each of which is associated with a corresponding one of said plurality of parallel RAKE receivers, to weight and combine RAKE output symbols output by the corresponding RAKE receiver over a plurality of symbol periods using weighting factors determined based on the cross-correlations between the symbols to generate filtered output symbols; and
    a summer to combine the filtered output symbols to generate an estimate of a symbol of interest,
  wherein the processor determines the cross-correlations by:
    estimating channel coefficients for multiple paths of a multi-path channel;
    computing spreading sequence cross-correlations; and
    determining the cross correlation between the symbol spreading codes for a symbol of interest and the at least one interfering symbol based on the estimated channel coefficients and the sequence cross-correlations.

14. The multi-code RAKE receiver of claim 13 wherein the plurality of RAKE receivers comprise a plurality of G-RAKE receivers.

15. The multi-code RAKE receiver of claim 13 wherein each linear transversal filter comprises:
  a tapped delay line comprising a series of delay elements to delay successive RAKE output symbols to generate delayed output symbols;
  a plurality of weighting elements to weight corresponding ones of the delayed output symbols by the weighting factors determined based on the cross-correlations between the symbols to generate weighted output symbols; and
  a summer to combine the weighted output symbols.

16. A method of reducing interference from a symbol of interest comprising:
  despreading and combining symbols received over a plurality of code channels in a plurality of RAKE receivers to produce RAKE output symbols, wherein each code channel comprises multiple paths;
  determining cross-correlations between different symbols;
  combining a plurality of RAKE output symbols output from each RAKE receiver over a plurality of symbol periods using weighting factors determined based on the cross-correlations between the symbols to generate a filtered output symbol for each RAKE receiver; and
  combining the plurality of filtered output symbols to generate an estimate of the symbol of interest with reduced self-interference.
  wherein determining the cross-correlations comprises:
    estimating channel coefficients for the multiple paths of the multi-path channel;
    computing spreading sequence cross-correlations; and
    determining the cross correlations between the different symbols based on the estimated channel coefficients and the sequence cross-correlations.

17. The method of claim 16 wherein combining a plurality of the RAKE output symbols output from each RAKE receiver over the plurality of symbol periods using weighting factors determined based on the cross-correlations between the symbols to generate the plurality of filtered output symbols, comprises:
- delaying the RAKE output symbols in a tapped delay line to generate a plurality of delayed output symbols;
- weighting the delayed output symbols by weighting factors determined based on the cross-correlations between the symbols to generate a plurality of weighted symbols; and
- summing the plurality of weighted symbols.

18. The method of claim 16 wherein despreading and combining symbols received over a plurality of code channels is performed in G-RAKE receivers.

19. A RAKE receiver for reducing interference from a symbol of interest comprising:
- a plurality of RAKE fingers to despread a plurality of symbols received over multiple paths of a multi-path channel;
- a processor to determine cross-correlations between different symbols; and
- a combiner to combine despread symbols from different symbol periods using weighting factors determined based on the cross-correlations between the different symbols to generate an estimate of the symbol of interest with reduced interference,
- wherein the processor determines the cross-correlations by:
  - estimating channel coefficients for the multiple paths of the multi-path channel;
  - computing spreading sequence cross-correlations; and
  - determining the cross correlation between the different symbols based on the estimated channel coefficients and the sequence cross-correlations.

20. The RAKE receiver of claim 19 wherein a first one of said plurality of RAKE fingers has a delay corresponding to the symbol of interest and a second one of said plurality of RAKE fingers has a delay corresponding to an interfering symbol.

21. The RAKE receiver of claim 20 wherein the combiner combines the symbol of interest with the interfering symbol using the cross-correlation to reduce the interference attributable to the interfering symbol from the symbol of interest.

22. The RAKE receiver of claim 19 wherein the combiner comprises a multi-channel filter comprising:
- a plurality of linear transversal filters, each of which is associated with a corresponding one of the plurality of RAKE fingers, to weight and combine despread symbols output by the corresponding RAKE fingers over a plurality of symbol periods using weighting factors determined based on the cross-correlations between the different symbols to generate a plurality of filtered output symbols; and
- a filter combiner to combine the filtered output symbols.

23. The RAKE receiver of claim 22 wherein each linear transversal filter comprises:
- a tapped delay line comprising a series of delay elements to delay the successive symbols output by the corresponding RAKE fingers to generate a set of delayed symbols during each symbol period;
- a plurality of weighting elements to weight corresponding ones of the delayed symbols by weighting factors determined based on the cross-correlations to generate weighted output symbols; and
- a summer to combine the weighted output symbols to generate each of the plurality of filtered output symbols.

24. The RAKE receiver of claim 19 wherein the combiner comprises:
- a RAKE combiner to RAKE combine despread symbols received over different paths in the same symbol period to generate a combined RAKE output symbol for each path; and
- a linear transversal filter to combine successive RAKE output symbols produced over a plurality of successive symbol periods using weighting factors determined based on the cross-correlations between the different symbols to reduce the interference attributable to the interfering symbols from the symbol of interest to generate the estimate of the symbol of interest.

25. The RAKE receiver of claim 24 wherein each linear transversal filter comprises:
- a tapped delay line comprising a series of delay elements to delay successive RAKE output symbols to generate a plurality of delayed RAKE output symbols during each symbol period;
- a plurality of weighting elements to weight delayed RAKE output symbols by weighting factors determined based on the cross-correlations between the different symbols to generate weighted RAKE output symbols; and
- a summer to combine the weighted RAKE output symbols.

26. The RAKE receiver of claim 19 wherein the RAKE fingers are divided into two or more groups, and wherein each group of RAKE fingers despreads symbols received over a different code channel.

27. The RAKE receiver of claim 26 wherein said combiner comprises:
- a RAKE combiner for each group of RAKE fingers to combine the RAKE finger output symbols within the corresponding group to generate RAKE output symbols; and
- a multi-channel filter to combine the RAKE output symbols to reduce the interference attributable to at least one interfering symbol from the symbol of interest, said multi-channel filter comprising:
  - a plurality of linear transversal filters, each of which is associated with one of the code channels, to weight and combine successive RAKE output symbols output from a corresponding RAKE combiner over a plurality of symbol periods using weighting factors determined based on the cross-correlations between the different symbols to generate filtered output symbols; and
  - a summer to combine the filtered output symbols.

28. The RAKE receiver of claim 27 wherein said RAKE combiners are G-RAKE combiners.

29. The RAKE receiver of claim 28 wherein each linear transversal filter comprises:
- a tapped delay line comprising a series of delay elements to delay successive RAKE output symbols output by the corresponding RAKE combiner to generate a plurality of delayed output symbols;
- a plurality of weighting elements to weight the delayed output symbols by weighting factors determined based on the cross-correlations between the different symbols to generate weighted output symbols; and
- a summer to combine the weighted output symbols.

30. The RAKE receiver of claim 19 wherein the cross-correlations between the different symbols form a correlation matrix used to determine the weighting factors.

31. The RAKE receiver of claim 30 wherein the correlation matrix of a first symbol period reuses a sub-matrix of the correlation matrix of a previous symbol period.

32. The RAKE receiver of claim 19 wherein the combiner further determines a scaling factor based on the channel estimate and multiplies the combined despread symbols by the scaling factor to improve a reliability of the estimate of the symbol of interest.

33. The RAKE receiver of claim 32 wherein the scaling factor is based on the weighting factors.

34. The RAKE receiver of claim 32 wherein the RAKE receiver receives traffic and pilot channel signals and wherein the scaling factor is based on a ratio of a power allocated to the traffic channel signal to a power allocated to the pilot channel signal.

35. A method of reducing interference from a symbol of interest comprising:
despreading symbols received over at least one multi-path channel;
determining cross-correlations between different symbols; and
combining the despread symbols from different symbol periods using weighting factors determined based on the cross-correlations between different symbols to generate an estimate of the symbol of interest with reduced interference,
wherein determining the cross-correlations comprises:
estimating channel coefficients for the paths of the multi-path channel;
computing spreading sequence cross-correlations; and
determining the cross correlations between the different symbols based on the estimated channel coefficients and the sequence cross-correlations.

36. The method of claim 35 wherein despreading the symbols received over the at least one multi-path channel comprises despreading the symbol of interest and at least one interfering symbol.

37. The method of claim 36 wherein combining the despread symbols from different symbol periods using weighting factors determined based on the cross-correlations between the symbol spreading codes comprises combining the symbol of interest with the at least one interfering symbol.

38. The method of claim 35 wherein combining the despread symbols from different symbol periods using weighting factors determined based on the cross-correlations between the different symbols comprises filtering the despread symbols in a multi-channel filter.

39. The method of claim 38 wherein filtering the despread symbols in the multi-channel filter comprises:
filtering each of the despread symbols in a linear transversal filter to combine despread symbols received over a plurality of symbol periods using weighting factors determined based on the cross-correlations between the different symbols to generate a plurality of filtered output symbols; and
summing the plurality of filtered output symbols.

40. The method of claim 39 wherein filtering each of the despread symbols in a linear transversal filter comprises:
delaying the despread symbol received over the same path in a tapped delay line to generate a plurality of delayed symbols;
weighting each of the plurality of delayed symbols using a weighting factor determined based on the cross-correlations between the different symbols to generate a plurality of weighted symbols; and
summing the plurality of weighted symbols to generate each of the plurality of filtered output symbols.

41. The method of claim 35 wherein combining the despread symbols from different symbol periods using weighting factors determined based on the cross-correlations between the different symbols comprises:
RAKE combining the despread symbols received over different paths during the same symbol period to generate a combined RAKE output symbol during each symbol period; and
combining successive RAKE output symbols produced over a plurality of successive symbol periods using weighting factors determined based on the cross-correlations between the different symbols.

42. The method of claim 41 wherein combining successive RAKE output symbols produced over a plurality of symbol periods comprises:
delaying the RAKE output symbol in a tapped delay line to generate a plurality of delayed output symbols during each symbol period;
weighting the delayed output symbols using weighting factors determined based on the cross-correlations between the different symbols to generate a plurality of weighted output symbols; and
summing the plurality of weighted output symbols.

43. The method of claim 35 wherein despreading the symbols received over the at least one multi-path channel comprises despreading symbols received over multiple paths of multiple code channels.

44. The method of claim 43 wherein combining the despread symbols from different symbol periods using weighting factors determined based on the cross-correlations between the different symbols comprises:
RAKE combining despread symbols received over each code channel to generate a combined RAKE output symbol for each code channel; and
combining the RAKE output symbols in a multi-channel filter.

45. The method of claim 44 wherein combining the RAKE output symbols in the multi-channel filter comprises:
filtering the RAKE output symbols for each code channel over a plurality of symbol periods in a linear transversal filter using weighting factors determined based on the cross-correlations between the different symbols to generate a filtered output symbol for each code channel during each symbol period; and
combining the filtered output symbols to generate the estimate of the symbol of interest.

46. The method of claim 45 wherein filtering the combined RAKE output symbols for each code channel over the plurality of symbol periods in the linear transversal filter using weighting factors determined based on the cross-correlations between the different symbols to generate a filtered output symbol for each code channel during each symbol period comprises:
delaying each of the RAKE output symbols in a tapped delay line to generate a plurality of delayed output symbols during each symbol period;
weighting the delayed output symbols by the weighting factors determined based on the cross-correlations between the different symbols to generate a plurality of weighted output symbols; and
summing the plurality of weighted output symbols.

47. The method of claim 35 wherein combining the despread symbols from different symbol periods using weighting factors determined based on the cross-correlations between different symbols comprises combining the despread symbols from different symbol periods using weighting factors determined based on a correlation matrix formed from the cross-correlations between different symbols.

48. The method of claim 47 further comprising reusing a sub-matrix of the correlation matrix of a first symbol period to form the correlation matrix of a second symbol period.

49. The method of claim 35 further comprising determining a scaling factor based on a channel estimate of at least one multi-path channel and multiplying the combined despread symbols by the scaling factor to improve a reliability of the estimate of the symbol of interest.

50. The method of claim 49 further comprises determining the scaling factor based on the weighting factors.

51. The method of claim 49 wherein the RAKE receiver receives traffic and pilot channel signals, the method further comprising determining the scaling factor based on a ratio of a power allocated to the traffic channel signal to a power allocated to a pilot channel signal.

52. A wireless communication device comprising:
at least one antenna to receive symbols over at least one multi-path channel; and
a RAKE receiver to reduce interference attributable to interfering symbols from a symbol of interest, the RAKE receiver comprising:
a plurality of RAKE fingers to despread the symbols received over the at least one multi-path channel, said received symbols comprising the symbol of interest and the interfering symbols;
a processor to determine cross-correlations between different symbols; and
a combiner to combine despread symbols from different symbol periods using weighting factors determined based on the cross-correlations between the different symbols to generate an estimate of a symbol of interest with reduced interference, wherein the processor determines the cross-correlations between the different symbols by:
estimating channel coefficients for the paths of the multi-path channel;
computing spreading sequence cross-correlations; and
determining the cross correlations between the different symbols based on the estimated channel coefficients and the sequence cross-correlations.

53. The wireless communication device of claim 52 wherein the combiner comprises a RAKE combiner to RAKE combine symbols received over a plurality of symbol periods.

54. The wireless communication device of claim 52 wherein said combiner comprises a multi-channel filter comprising:
a plurality of linear transversal filters, each of which is associated with a corresponding one of the plurality of RAKE fingers, to weight and combine despread symbols output by the corresponding RAKE finger over a plurality of symbol periods using the weighting factors determined based on the cross-correlations between the different symbols to generate a plurality of filtered output symbols; and
a filter combiner to combine the filtered output symbols.

55. The wireless communication device of claim 52 wherein the combiner comprises:
a RAKE combiner to RAKE combine despread symbols received over different paths in the same symbol period to generate a combined RAKE output symbol for each path in each symbol period; and
a linear transversal filter to combine successive RAKE output symbols produced over a plurality of successive symbol periods using weighting factors determined based on the cross-correlations between the different symbols to generate the estimate of the symbol of interest.

56. The wireless communication device of claim 52 wherein the RAKE fingers are divided into two or more groups, and wherein each group of RAKE fingers despreads symbols received over a different code channel.

57. The wireless communication device of claim 56 wherein said combiner comprises:
a RAKE combiner for each group of RAKE fingers combines the RAKE finger output symbols within the corresponding group to generate RAKE output symbols; and
a multi-channel combiner to combine the RAKE output symbols to reduce the interference attributable to at least one interfering symbol from the symbol of interest, said multi-channel filter comprising:
a plurality of linear transversal filters, each of which is associated with one of the code channels, to weight and combine successive RAKE output symbols output from a corresponding RAKE combiner over a plurality of symbol periods using weighting factors determined based on the cross-correlations between the different symbols to generate filtered output symbols; and
a summer to combine the filtered output symbols.

58. The wireless communication device of claim 57 wherein the RAKE combiner for each code channel comprises a G-RAKE combiner.

59. The wireless communication device of claim 52 wherein the wireless communication device comprises a mobile terminal.

60. The wireless communication device of claim 52 wherein the wireless communication device comprises a base station.

61. A computer readable media stored in a wireless communication device for storing a set of instructions to reduce interference attributable to at least one interfering symbol from a symbol of interest, the set of instructions comprising:
instructions to despread symbols received over at least one multi-path channel, said received symbols comprising the symbol of interest and the at least one interfering symbol;
instructions to determine cross-correlations between different symbols; and
instructions to combine the despread symbols from different symbol periods using weighting factors determined based on the cross-correlations between the different symbols to generate an estimate of a symbol of interest with reduced interference,
wherein the instructions to determine the cross-correlation between the different symbols comprise instructions to:
estimate channel coefficients for the paths of the multi-path channel;
compute spreading sequence cross-correlations; and
determine the cross correlations between the different symbols based on the estimated channel coefficients and the sequence cross-correlations.

62. The program of claim 61 wherein the instructions to combine the despread symbols from different symbol periods using weighting factors determined based on the cross-correlations between the different symbols comprises instructions to combine the symbol of interest with the at least one interfering symbol.

63. The program of claim 61 wherein the instructions to combine the despread symbols from different symbol periods using weighting factors determined based on the cross-correlations between the different symbols comprises filtering the despread symbols in a multi-channel filter.

64. The program of claim 61 wherein the instructions to combine the despread symbols from different symbol periods using weighting factors determined based on the cross-correlations between the different symbols comprises:
- instructions to RAKE combine the despread symbols received over different paths during the same symbol period to generate a combined RAKE output symbol during each symbol period; and
- instructions to combine successive RAKE output symbols produced over a plurality of successive symbol periods using weighting factors determined based on the cross-correlations between the different symbols.

65. The program of claim 61 wherein the instructions to combine the despread symbols from different symbol periods using weighting factors determined based on the cross-correlations between the different symbols comprises:
- instructions to RAKE combine despread symbols received over each code channel to generate a combined RAKE output symbol for each code channel; and
- instructions to combine the RAKE output symbols in a multi-channel filter.

66. A circuit to implement a process to reduce interference attributable to at least one interfering symbol from a symbol of interest, the circuit comprising:
- a receiver circuit to:
  - despread symbols received over at least one multi-path channel, said received symbol comprising the symbol of interest and the at least one interfering symbol;
  - determine cross-correlations between different symbols; and
  - combine the despread symbols from different symbol periods using weighting factors determined based on the cross-correlations between the different symbols to generate an estimate of a symbol of interest with reduced interference,
- wherein the receiver circuit determines the cross-correlation between the different symbols by:
  - estimating channel coefficients for the paths of the multi-path channel;
  - computing spreading sequence cross-correlations; and
  - determining the cross correlations between the different symbols based on the estimated channel coefficients and the sequence cross-correlations.

67. The circuit of claim 66 wherein the receiver circuit combines the despread symbols from different symbol periods using weighting factors determined based on the cross-correlations between the different symbols by combining the symbol of interest with the at least one interfering symbol.

68. The circuit of claim 66 wherein the receiver circuit combines the despread symbols from different symbol periods using weighting factors determined based on the cross-correlations between the different symbols by filtering the despread symbols in a multi-channel filter.

69. The circuit of claim 66 wherein the receiver circuit combines the despread symbols from different symbol periods using weighting factors determined based on the cross-correlations between the different symbols by:
- RAKE combining the despread symbols received over different paths during the same symbol period to generate a combined RAKE output symbol during each symbol period; and
- combining successive RAKE output symbols produced over a plurality of successive symbol periods using weighting factors determined based on the cross-correlations between the different symbols.

70. The circuit of claim 66 wherein the receiver circuit combines the despread symbols from different symbol periods using weighting factors determined based on the cross-correlations between the different symbols by:
- RAKE combining despread symbols received over each code channel to generate a combined RAKE output symbol for each code channel; and
- combining the RAKE output symbols in a multi-channel filter.

71. The circuit of claim 66 wherein the circuit comprises an application specific integrated circuit.

\* \* \* \* \*

UNITED STATES PATENT AND TRADEMARK OFFICE
CERTIFICATE OF CORRECTION

PATENT NO. : 8,432,952 B2
APPLICATION NO. : 10/720492
DATED : April 30, 2013
INVENTOR(S) : Fulghum et al.

It is certified that error appears in the above-identified patent and that said Letters Patent is hereby corrected as shown below:

In the Specification:

In Column 6, Line 12, after Equation, insert -- , --.

In Column 9, Line 38, delete "defined as" and insert -- defined as: --, therefor.

In Column 9, Line 67, delete "written as" and insert -- written as: --, therefor.

In Column 12, Line 27, delete "a," and insert -- $\alpha$, --, therefor.

In Column 12, Line 30, delete "calculating a" and insert -- calculating $\alpha$ --, therefor.

In Column 12, Line 32, delete ""a"" and insert -- "$\alpha$" --, therefor.

In Column 12, Line 36, delete ""a"" and insert -- "$\alpha$" --, therefor.

In the Claims:

In Column 17, Line 57, in Claim 4, delete "interest." and insert -- interest, --, therefor.

In Column 20, Line 57, in Claim 16, delete "self-interference." and insert -- self-interference, --, therefor.

Signed and Sealed this
Eighth Day of October, 2013

Teresa Stanek Rea
*Deputy Director of the United States Patent and Trademark Office*